M. M. GOLDBERG.
CASH REGISTER.
APPLICATION FILED MAR. 23, 1916.
1,325,195.
Patented Dec. 16, 1919.
16 SHEETS—SHEET 5.
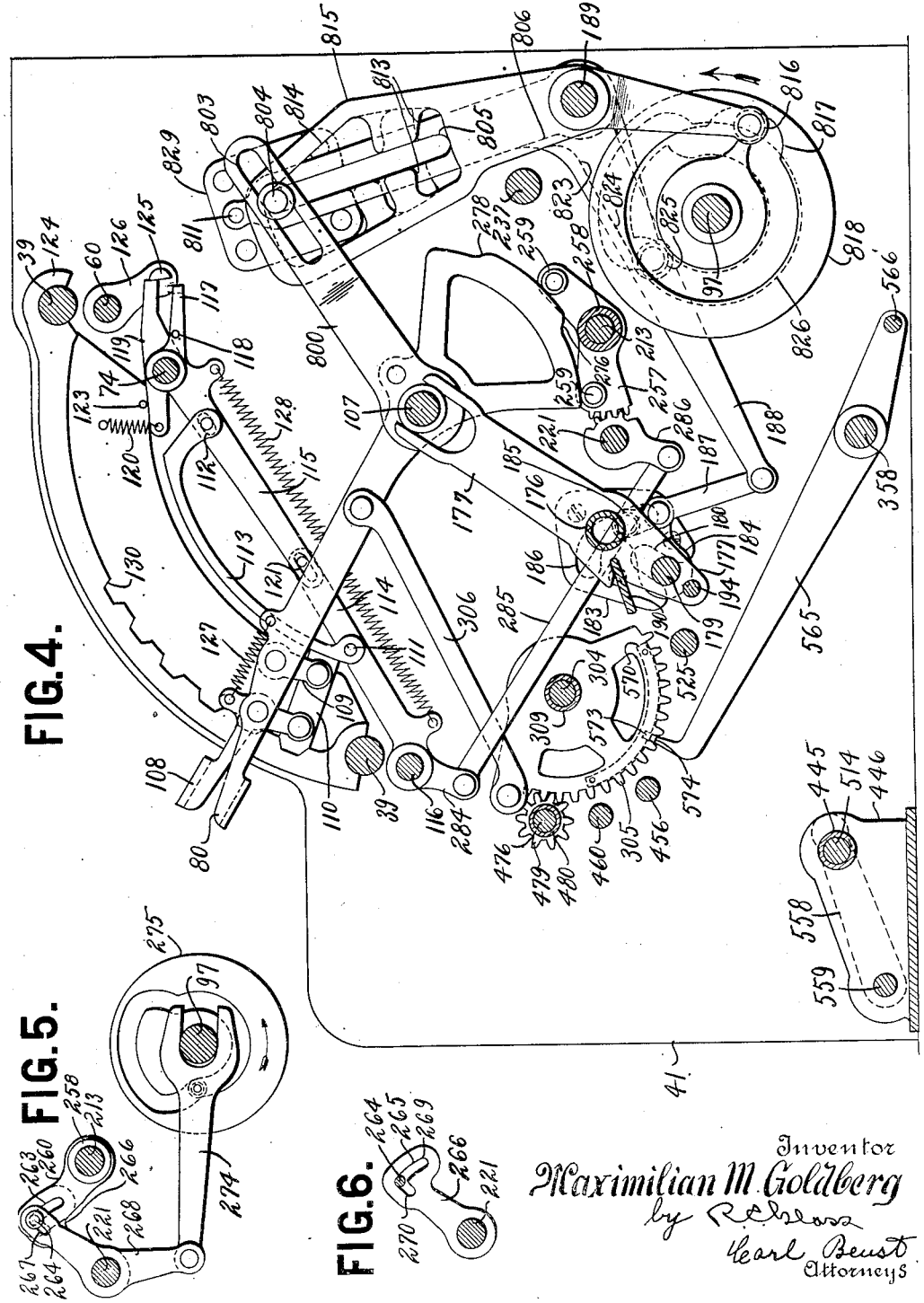

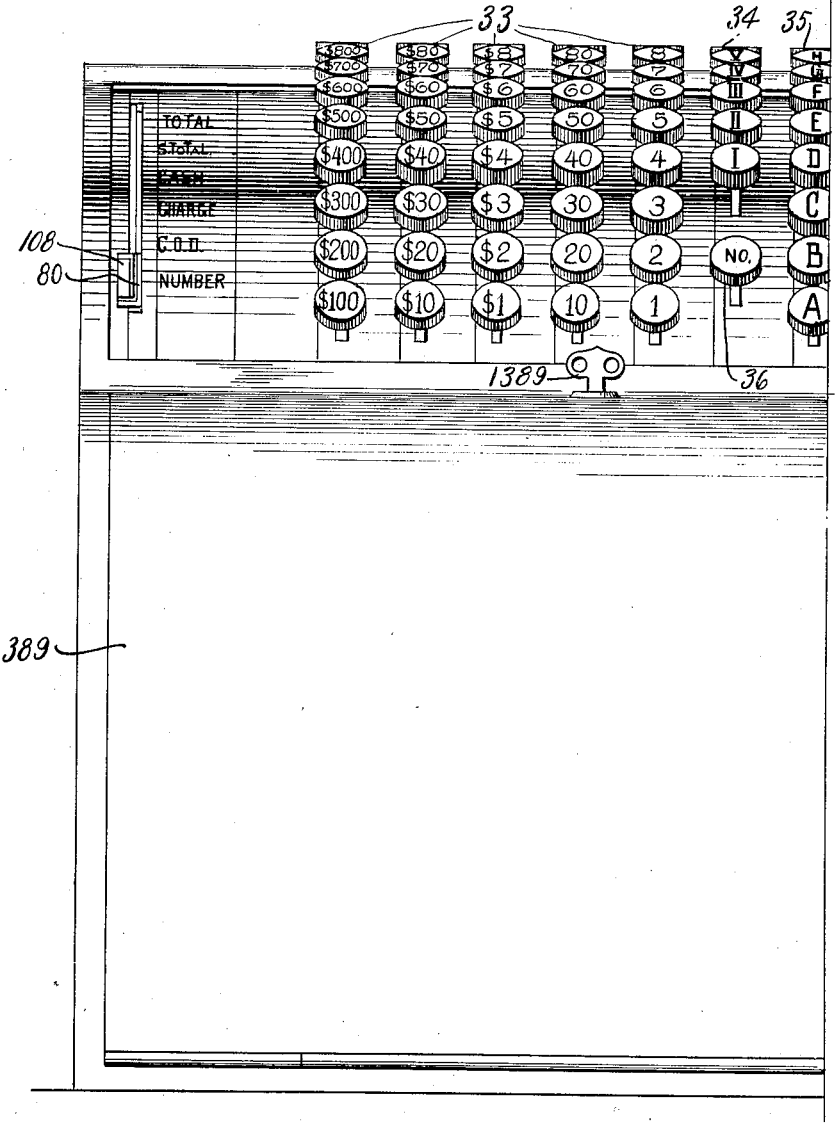

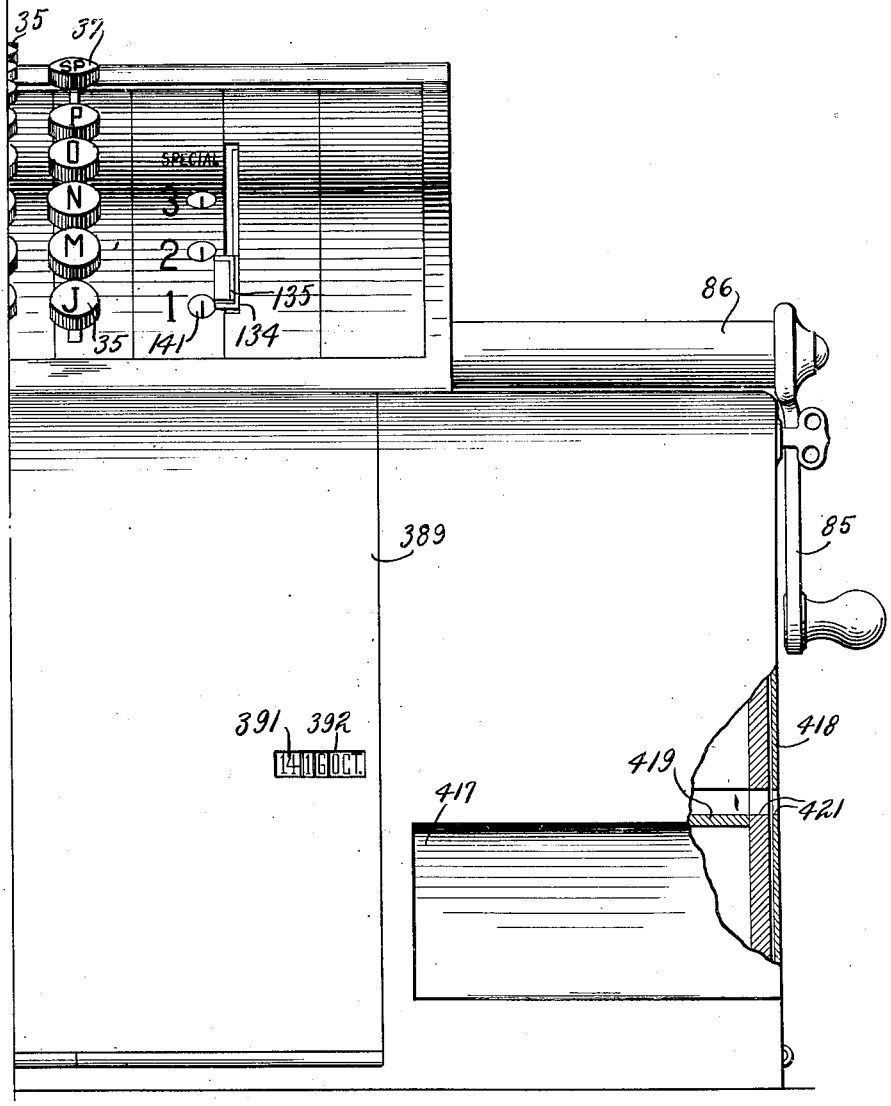

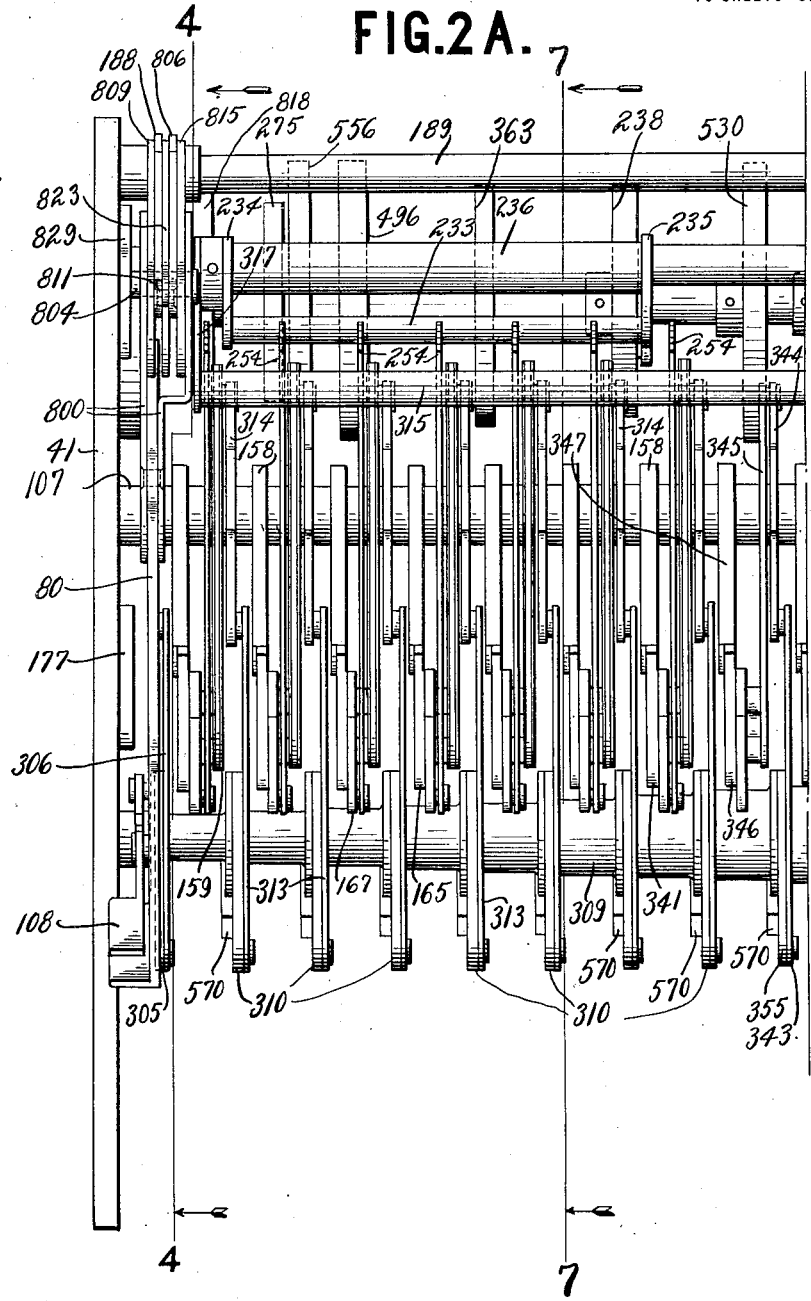

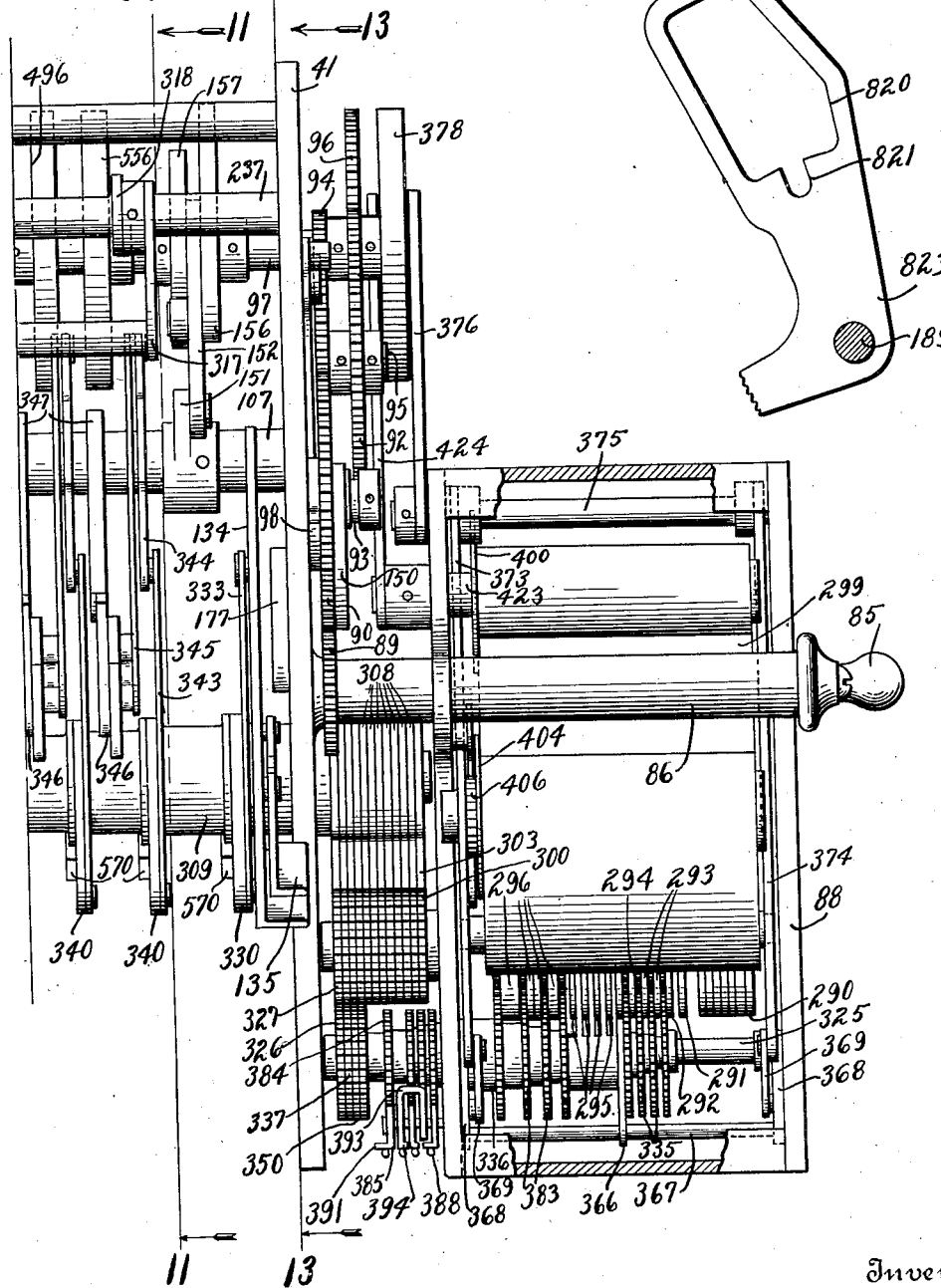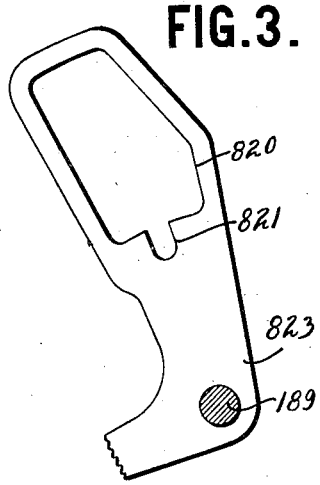

M. M. GOLDBERG.
CASH REGISTER.
APPLICATION FILED MAR. 23, 1916.

1,325,195.

Patented Dec. 16, 1919.
16 SHEETS—SHEET 6.

FIG. 7.

Inventor
Maximilian M. Goldberg,
by R. C. Sloss
Earl Beust
Attorneys

M. M. GOLDBERG.
CASH REGISTER.
APPLICATION FILED MAR. 23, 1916.
1,325,195. Patented Dec. 16, 1919.
16 SHEETS—SHEET 7.
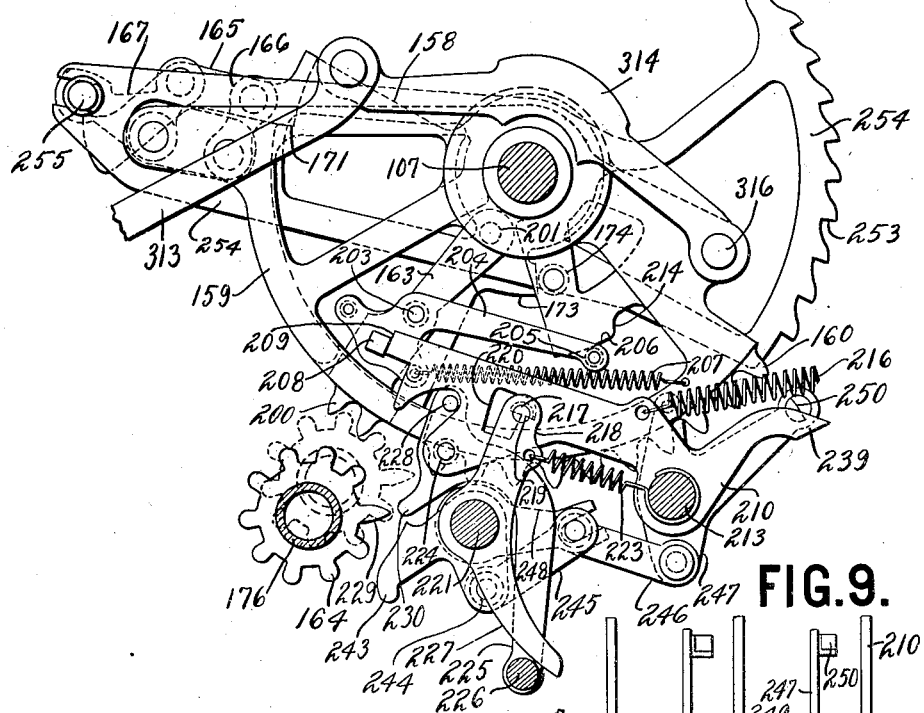
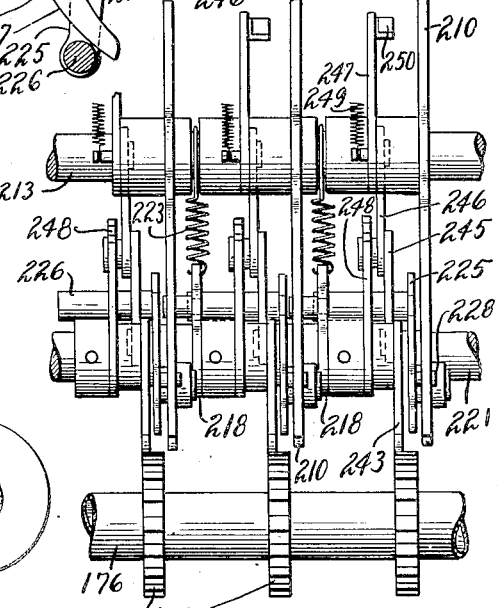
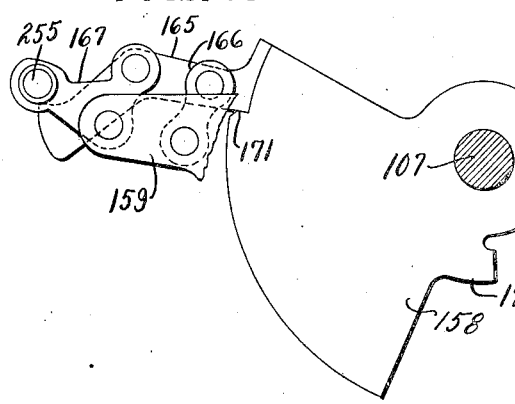
Inventor
Maximilian M. Goldberg.
by R. C. Bloss
Carl Beust
Attorney M. M. GOLDBERG.
CASH REGISTER.
APPLICATION FILED MAR. 23, 1916.
1,325,195.
Patented Dec. 16, 1919.
16 SHEETS—SHEET 8.
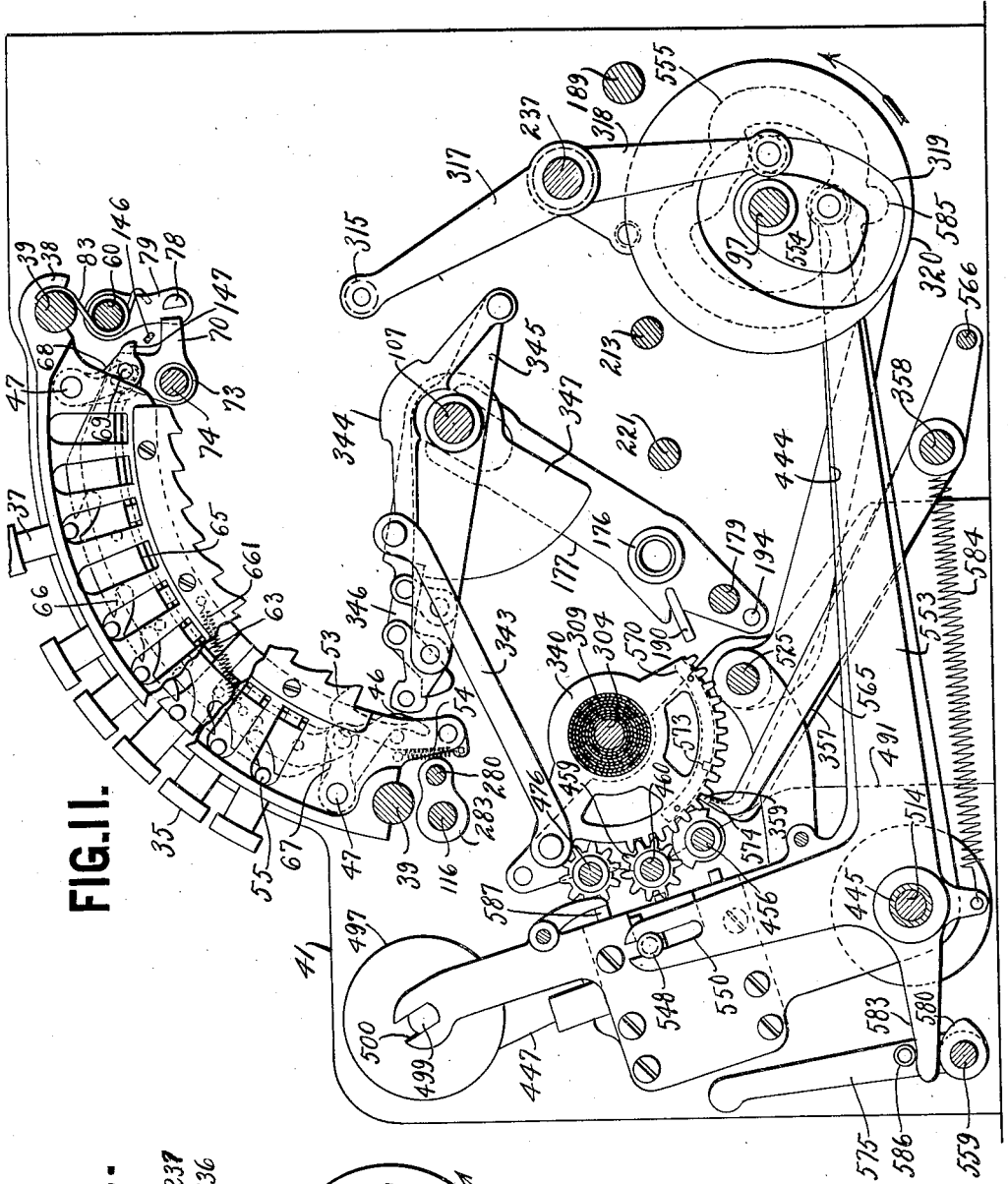
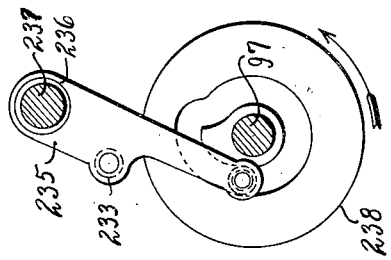
Inventor
Maximilian M. Goldberg.
by R. L. Glass
Carl Beust
Attorneys

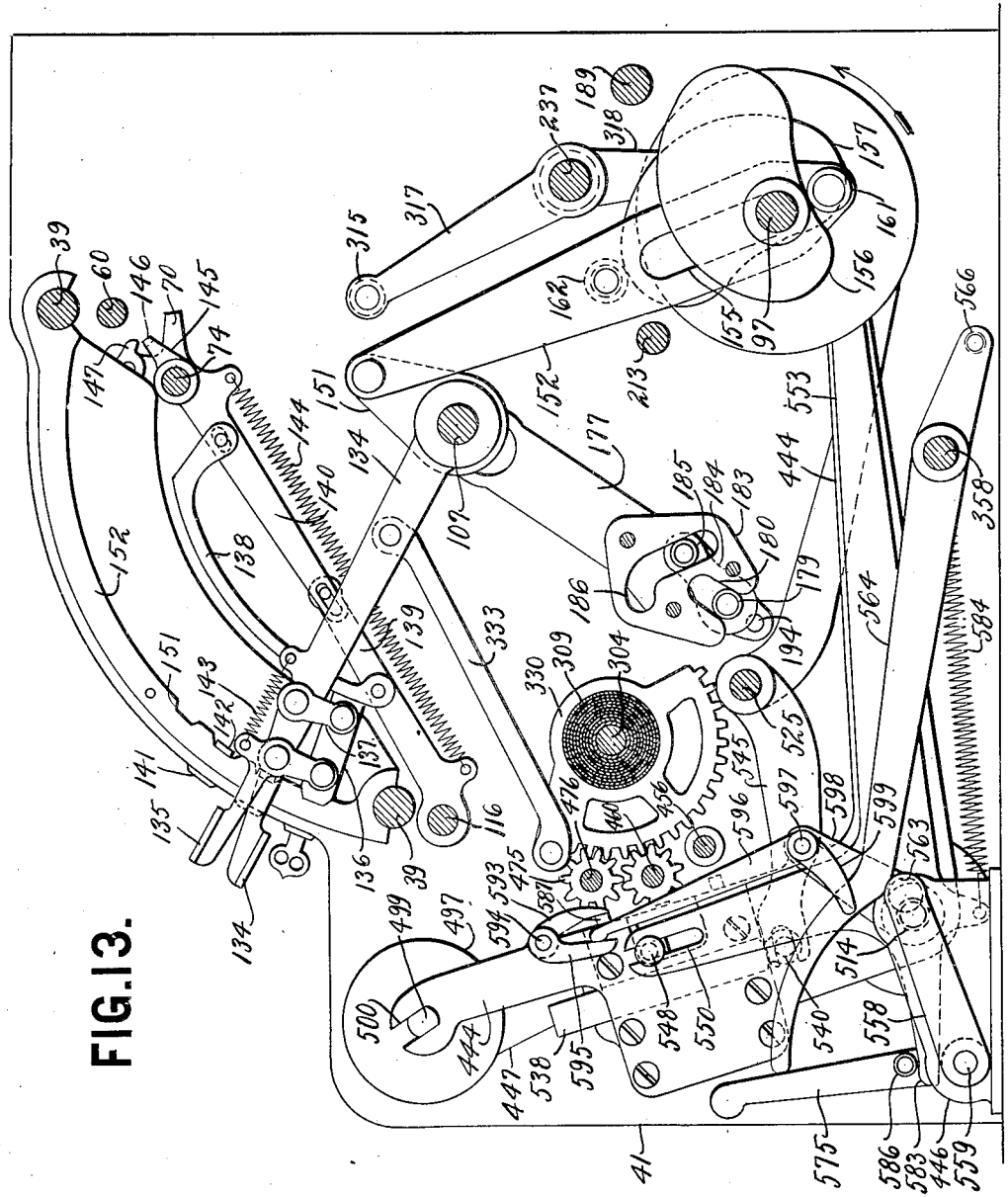

M. M. GOLDBERG.
CASH REGISTER.
APPLICATION FILED MAR. 23, 1916.

1,325,195.

Patented Dec. 16, 1919.
16 SHEETS—SHEET 10.

Inventor
Maximilian M. Goldberg.
by R. C. Glass
Karl Beust
Attorneys

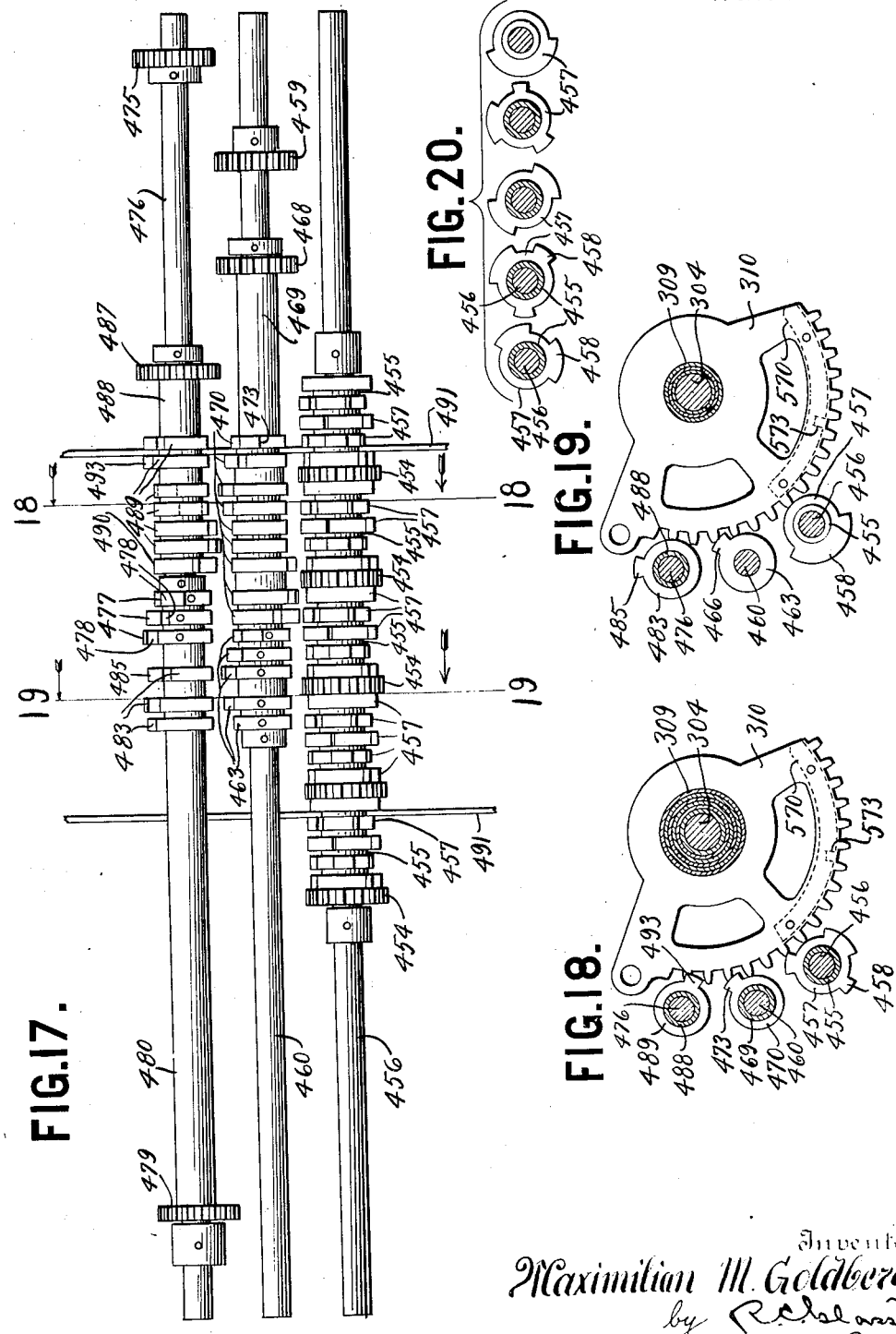

M. M. GOLDBERG.
CASH REGISTER.
APPLICATION FILED MAR. 23, 1916.

1,325,195.

Patented Dec. 16, 1919.
16 SHEETS—SHEET 12.

Inventor
Maximilian M. Goldberg.
by R. C. Sloan
Carl Beust
Attorneys

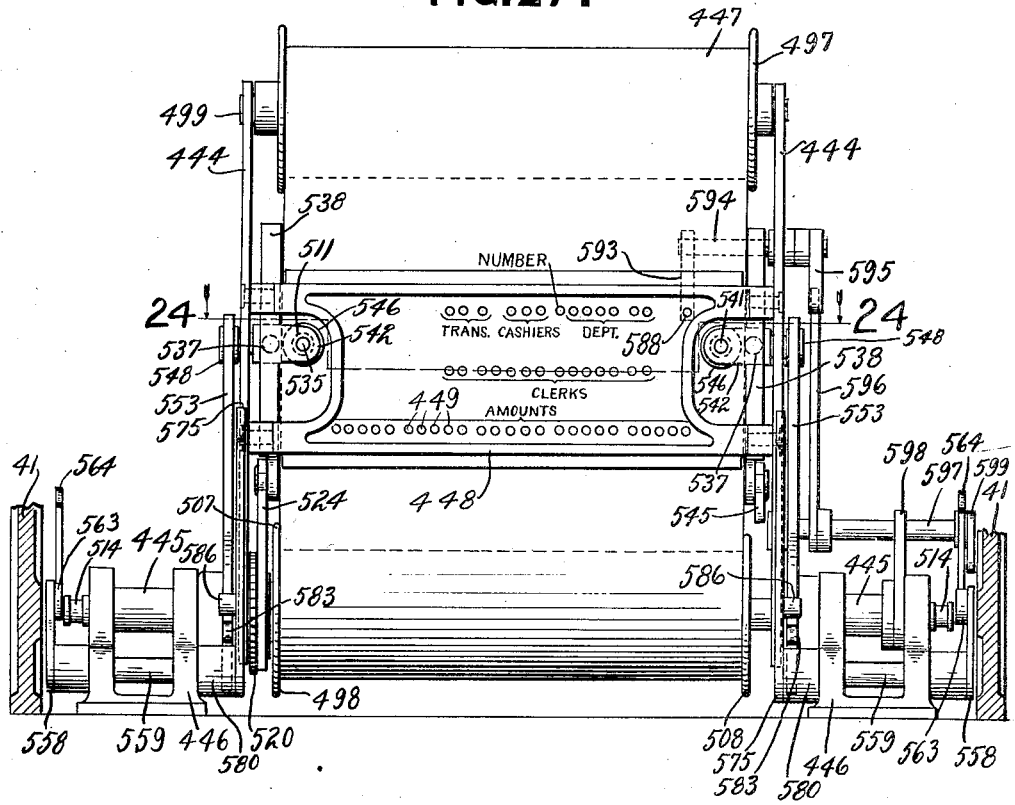
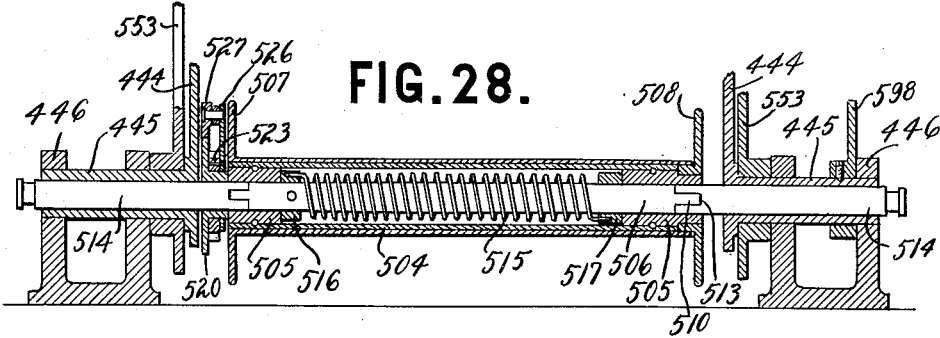

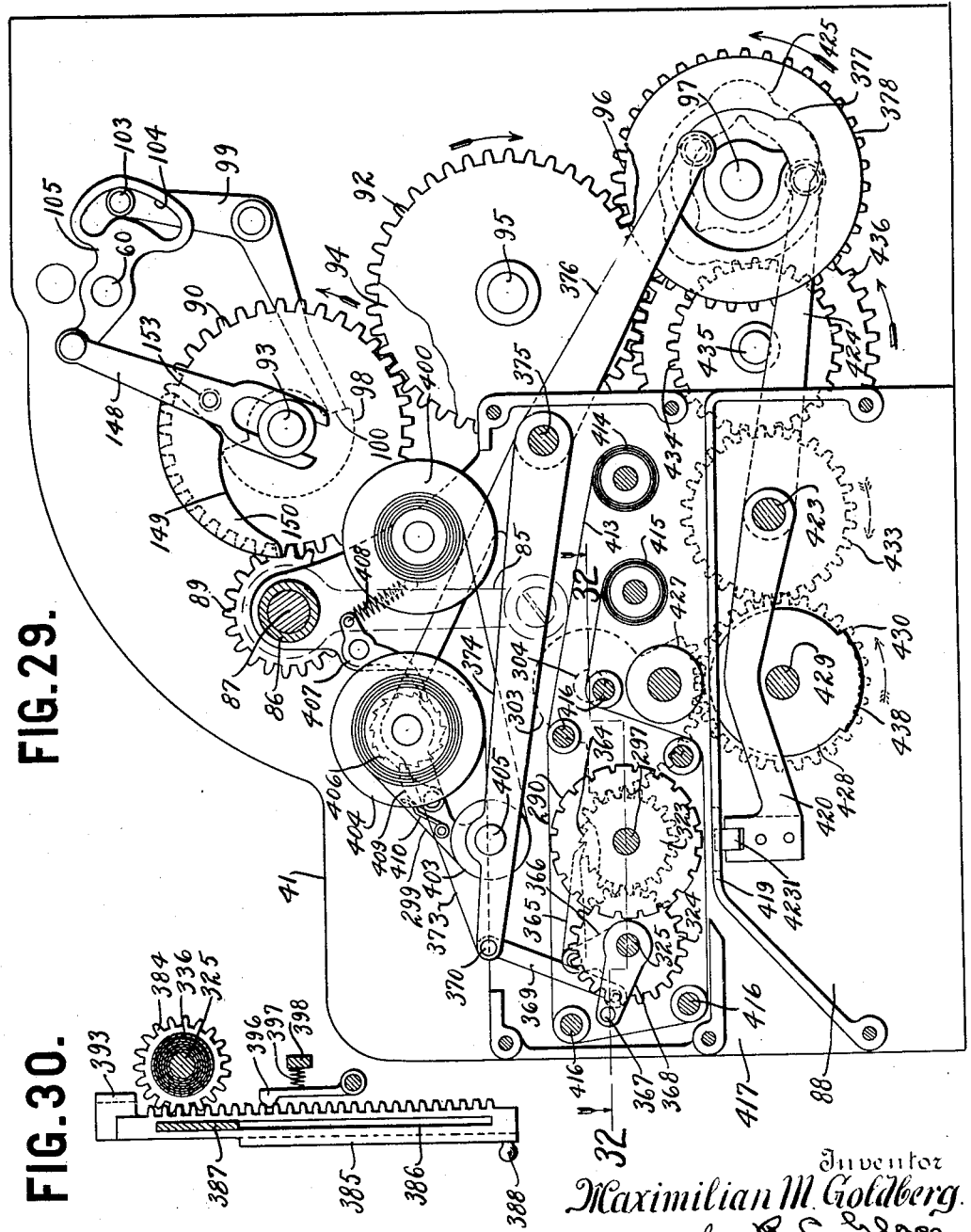

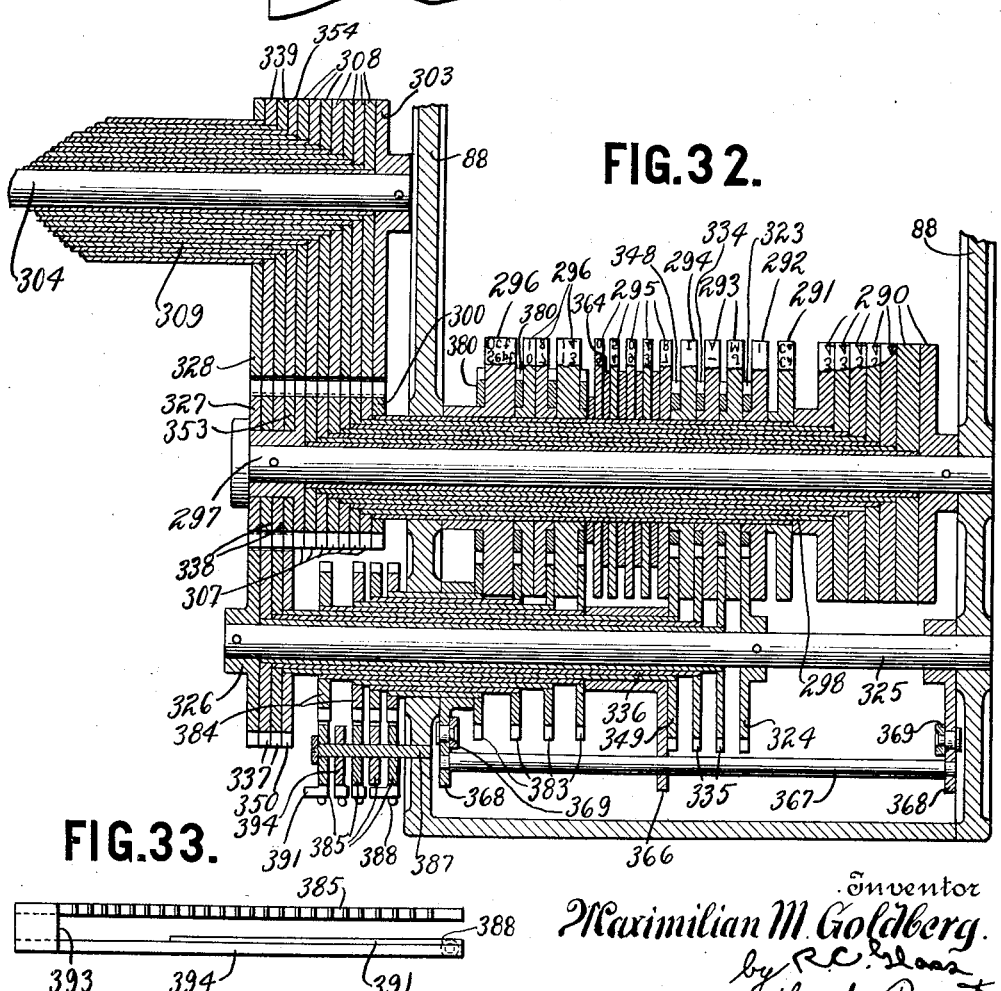

UNITED STATES PATENT OFFICE.

MAXIMILIAN M. GOLDBERG, OF DAYTON, OHIO, ASSIGNOR TO THE NATIONAL CASH REGISTER COMPANY, OF DAYTON, OHIO.

CASH-REGISTER.

1,325,195.     Specification of Letters Patent.     Patented Dec. 16, 1919.

Application filed March 23, 1916. Serial No. 86,087.

*To all whom it may concern:*

Be it known that I, MAXIMILIAN M. GOLDBERG, a citizen of the United States, residing at Dayton, in the county of Montgomery and State of Ohio, have invented certain new and useful Improvements in Cash-Registers, of which I declare the following to be a full, clear, and exact description.

This invention relates to accounting machines such as cash registers and the like.

The principal object of this invention is to provide novel means under the control of manipulative devices for perforating record material, adapted to control accounting operations of an auditing machine. In the preferred form of embodiment described herein, the perforating mechanism is adapted to make perforations in a record strip to represent the amount of each transaction, the class of the transaction, the clerk making the transaction, the department in which the clerk is operating and the cashier who has charge of the department. The machine of the present invention is adapted for use in department stores and the like in connection with an auditing machine such as that shown and described in an application for Letters Patent of the United States No. 38,250, filed July 6, 1915, by Maximilian M. Goldberg the present applicant. This auditing machine is provided with totalizers and actuating means therefor, the totalizers being selected and the actuating means operated under the control of the perforations in the record strip.

Another object of this invention is to provide novel feeding means for the record strip.

A further object of the invention is to provide means for marking a record strip so as to indicate the number of the perforating machine as an incident to the removal of the strip from the machine. In the present form of embodiment the perforating means is constructed to make perforations controlling the selection and operation of a particular accounting device in the auditing machine which by reason of these perforations is actuated to print the number of the machine making the perforations and means are provided for preventing removal of the record strip from the machine of the present invention until after the perforations are made.

A further object of this invention is to make a perforation as an incident to the insertion of the record strip into the machine. When the strip is attached to the auditing machine of the above mentioned co-pending application this perforation is employed to control the stopping of the machine after all of the transactions, represented by perforations in the strip, have been entered on the totalizers.

It is also an object of this invention to provide a totalizer and improved transfer mechanism therefor.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figures 1ᴬ and 1ᴮ combined constitute a front elevation of the machine embodying the present invention.

Figs. 2ᴬ and 2ᴮ combined constitute a detail top plan view of the differential mechanism and the printing mechanism.

Fig. 3 is a detail partial view of the lever operated to move the totalizer into engagement with the actuating mechanism during total printing operations.

Fig. 4 is a transverse vertical section taken through the machine on the line 4—4 of Fig. 2ᴬ.

Fig. 5 is a detail view of the mechanism for moving pawls into position to be operated by the totalizer during total and sub-total printing operations.

Fig. 6 is a detail view of one of the arms shown in Fig. 5.

Fig. 7 is a transverse vertical section taken on the line 7—7 of Fig. 2ᴬ and including the keyboard and perforating mechanism.

Fig. 8 is a full sized detail side view of one of the amount differential units.

Fig. 9 is a full sized detail top plan view of three of the totalizer pinions and the corresponding parts operated thereby to effect transfers and control the extent of movement of the amount differential mechanism during total and sub-total printing operations.

Fig. 10 is a full sized detail side view of the driving segment and latch shown in Fig. 8.

Fig. 11 is a transverse vertical section taken on the line 11—11 of Fig. 2ᴮ and including the keyboard and perforating mechanism.

Fig. 12 is a detail side view of the cam for restoring the transfer mechanism to normal position.

Fig. 13 is a transverse vertical section taken on the line 13—13 of Fig. 2ᴮ and including the cashier or clerk's lever and perforating mechanism.

Fig. 17 is a full sized detail front view of the mechanism for operating the punches.

Fig. 18 is a full sized detail transverse vertical section taken on the line 18—18 of Fig. 17.

Fig. 19 is a full sized detail transverse vertical section taken on the line 19—19 of Fig. 17.

Fig. 20 is a full sized detail view of the series of disks operated under the control of a bank of amount keys and employed to operate corresponding punches.

Fig. 27 is a detail front elevation of the perforating mechanism.

Fig. 28 is a longitudinal section taken through the frictional feed device for the record strip.

Fig. 29 is a right hand side elevation of the machine, the view being taken just within the right hand side of printer frame.

Fig. 30 is a detail view of the means for operating the date type carriers.

Fig. 31 is a portion of the detail strip printed by the printing mechanism.

Fig. 32 is a transverse horizontal section taken on the line 32—32 of Fig. 29.

Fig. 33 is a detail front view of the means for adjusting the tens of day type carrier of the dating device.

Figure 14:
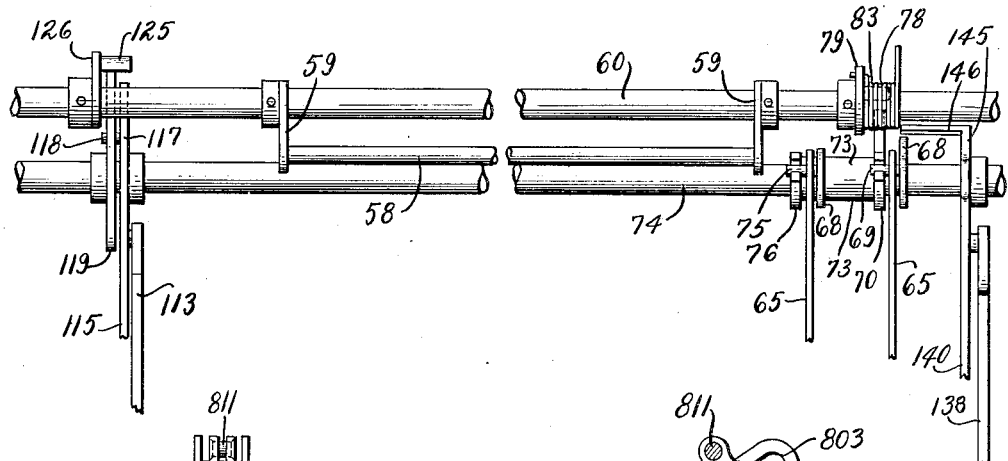
Fig. 14 is a detail top plan view of part of the mechanism for effecting the release of the operating mechanism.
Figure 15:
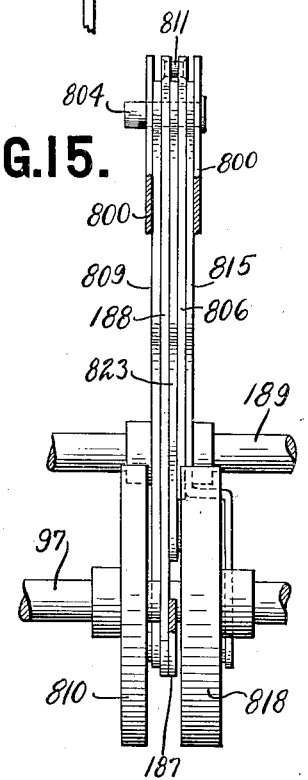
Fig. 15 is a detail front plan view of the means for moving the totalizer into engagement with the actuating racks during adding operations and total and sub-total printing operations.

The system in which a machine of the present invention is more particularly adapted for use is the one commonly employed in department stores in which a plurality of departments are assigned to a cashier each of which departments has a number of clerks operating therein. As each clerk makes a sale she forwards a sales slip to the cashier having supervision over her department and the cashier sets up on the cash register, manipulative devices corresponding to the total of the sale and the class of the sale, as well as manipulative devices designating the clerk, department and cashier. After setting up these various manipulative devices, the data corresponding to the manipulative devices is recorded upon the sales slip and also upon a detail strip contained in the machine and then a portion of the sales slip containing the printed record is returned to the clerk who wraps it with the goods and hands them to the customer.

In general the machine shown herein is provided with five banks of amount keys, a bank of department keys, and with two banks of clerks' keys as well as with a cashier's lever for controlling the printing of the cashier's number. The machine is also provided with a manually adjustable lever called the "transaction" lever herein, for controlling the different accounting operations of the machine. When this transaction lever is adjusted to its "cash" position the amount set up on the amount keys is added onto a totalizer but when transactions other than "cash," such as "C. O. D." and "credit" transactions, are entered in the machine no entries of such transactions are made upon the totalizer but they are recorded on the sales slip and detail strip. This lever is also adjustable to "total" and "sub-total" positions to control the machine for total and sub-total printing operations.

The differential mechanism controlled by the various manipulative devices is connected to type carriers for recording upon a detail strip and the sales slip the data set up on the manipulative devices. In addition to printing this data the consecutive number of the sale and the date thereof is also recorded upon the detail strip.

The manipulative devices also control means for selecting punches for perforating a record strip to represent the amount of the transaction, the class of the transaction, the clerk by whom the transaction is made, the department in which it is made, and the cashier having charge of the department. These perforations are used for the purpose of controlling subsequent operations of the totalizers of an auditing machine such as that fully shown and described in the above mentioned co-pending application.

When the record strip to be perforated is inserted in the present machine a punch is automatically operated to make a perforation in the record strip. This perforation is employed to control the stopping of the auditing machine when the record strip is run through the auditing machine, the latter being stopped after all of the transactions entered in the record strip have been accumulated on the totalizers in this auditing machine.

Before the record strip is removed from the machine of the present invention it is necessary to set up the number of said machine on the amount keys and then operate the number key having the caption "No.". Then when the record strip is removed from the machine a punch is operated to make a perforation in the record strip indicating the number of the machine. When the record strip is run through the auditing machine of the above mentioned co-pending application this perforation selects an accounting device which is actuated under the control of perforations representing the number of the machine from which the strip is removed the accounting device being actuated to print this number.

For the purpose of illustration the invention is shown applied to a type of machine the general principle of which is described in Letters Patent of the United States granted to Wm. A. Chryst No. 1,230,864, dated June 26, 1917. While the invention is shown applied to this particular type of machine it is to be understood that it is susceptible of embodiment in other types of accounting machines and therefore it is not intended to limit the scope of the present invention to use with the particular type of machine shown. It is also to be understood that while the machine is shown as adapted for use in connection with the auditing machine of the above mentioned co-pending application of M. M. Goldberg, No. 38,250, filed July 6, 1915, yet the invention is adapted for use in connection with any other form of auditing machine or as a cash register independently of an auditing machine and in many other relations and connections without constituting a departure from the scope of the present invention.

*Keyboard.*

The keyboard comprises five banks of amount keys 33 (Fig. 1ᴬ) a bank of department keys 34 and two banks of clerks' keys 35 (Figs. 1ᴬ and 1ᴮ). Included in the bank of department keys 34 is a number key 36 and included in the right hand bank of clerks' keys is a special key 37 the function of which will be described hereinafter. The construction of the key banks is very similar to that shown and described in the above mentioned Chryst patent and therefore they will be described but briefly here.

The keys of each bank are mounted in an individual frame 38 (Figs. 7 and 11) mounted on cross rods 39 which are supported at their ends in the side frames 41 of the machine. Springs 40 (Fig. 7) are employed normally to retain the keys in undepressed position.

The amount keys 33 (Fig. 7) coöperate with key detents 43 and locking plates 44. The detents 43 are supported at their upper and lower ends respectively by arms 45 and 46 loosely mounted on pins 47 projecting from the key frames 38. When an amount key in a bank is depressed the inclined edge of a shoulder 48 on the key engages a corresponding pin 49 on the detent 43, thus moving the latter downwardly until the shoulder is past the pin, when the detent rises slightly retaining the key in depressed position. The arm 46 engages a pin 50 on a zero stop pawl 53 pivoted on the key-frame 38. The pawl 53 is normally in effective position and when the detent 43 is lowered the pawl is rocked clockwise to render it ineffective. A spring 54 serves to retain the pawl 53 and the detent 43 in normal position and restores the pawl and detent to normal position when the operated key is released.

The locking plates 44 for the banks of amount keys 33 are provided with extensions 52 which, immediately upon depression of a clerk's key 35, pass over pins 55 on the depressed amount keys and under the pins 55 on the undepressed amount keys thereby preventing operation of the amount keys during an operation of the machine. In order to give the locking plates 44 the required upward movement their upper supporting arms 56 are provided with extensions 57 extending over a rod 58 (Figs. 7 and 14) carried by arms 59 fast on a shaft 60. This shaft 60 is rocked clockwise (Fig. 7) upon depression of a clerk's key as will be described presently, whereupon the rod 58 lifts the locking plates 44 into locking position.

A detent and locking plate (not shown) similar to the detent 43 and locking plate 44 for a bank of amount keys are also provided for the bank of department keys 34 and are operated in the same manner when a department key or the number key 36 and a clerk's key are depressed.

The clerks' keys 35 (Fig. 11) in each bank coöperate with a corresponding plate 63 which is similar to the detents 43 for the banks of amount keys and supported in a similar manner. When a clerk's key of a bank is depressed the plate 63 is lowered to move the corresponding zero stop pawl 53 out of normal operative position but not for the purpose of retaining the depressed key in depressed position, the clerks' keys not being provided with locking shoulders as is the case with the amount keys. Coöperating with the pins 55 on the clerks' keys of each bank is a plate 65 provided with curved slots 66 which the pins 55 on the clerks' keys enter upon depression of the keys. As the slots 66 are curved depression of a clerk's key through its pin 55 lowers the plate 65 against the action of a spring 661, supporting arms 67 and 68 for the plate being swung on the pivots 47. When the special key 37 (Fig. 11) is depressed it operates the plates 63 and 65 for the right hand bank of clerks' keys in the same manner as depression of one of the clerks' keys.

A pin 69 (Figs. 11 and 14) which pivotally connects the plate 65 for the right hand bank of clerks' keys to its upper supporting arm 68 projects into a recess formed in the upwardly extending arm of a lever 70 fast on a sleeve 73. The sleeve 73 is mounted on a cross rod 74 supported at its ends in the side frames 41 of the machine. A pin 75 (Fig. 14) connecting the plate 65 for the left hand bank of clerks' keys to its supporting arm 68 projects into a recess formed in the upper end of an arm 76 also fast on the sleeve 73. Through this connection between the two plates 65 it can be seen that when a clerk's key in one bank is depressed the plate 65 for the other bank of clerks' keys is lowered with the plate 65 for the bank in which the key is depressed thereby locking all of the undepressed keys of the two banks against operation since the slots 66 in the plates 65 are moved away from under the pins 55 on these keys.

Upon depression of a clerk's key the shaft 60 (Figs. 7 and 14) is rocked to raise the cross rod 58 and therefore the locking plates 44 for the amount and department keys as described above. The rearwardly extending arm of the lever 70 (Fig. 11) is normally in the path of movement of a pin 78 mounted on an arm 79 fast on the shaft 60. A transaction lever 80 (Figs. 1<sup>A</sup> and 4) is operated before a clerk's key is depressed and upon operation of this transaction lever the shaft 60 is rocked slightly clockwise (Fig. 11) by a spring 83 coiled about the shaft; this movement of the shaft being arrested by the engagement of the pin 78 with the outer end of the horizontal arm of the lever 70. When a clerk's key is depressed the lever 70 is rocked counter-clockwise thereby moving its rearwardly extending arm out of engagement with the stud 78 whereupon the spring 83 rocks the shaft 60 clockwise to raise the rod 58 (Figs. 7 and 14) and thereby the locking plates 44 for the amount and department keys. As the pin 78 (Fig. 11) passes under the rearwardly extending arm of the lever 70 it can be seen that the sleeve 73 and the plates 65 for the two banks of clerks' keys cannot be moved back to normal position when the operator removes his finger from the depressed clerk's key. As the slots 66 in the plates 65 are curved each coöperates with the pin 55 on its corresponding key when the key is depressed and retains the latter in depressed position while the plates 65 are in moved position.

When a clerk's key is depressed the mechanism normally locking the machine against operation is operated to permit operation of the machine. The machine is shown as operated by a crank handle 85 (Figs. 1<sup>B</sup> and 2<sup>B</sup> and 29) but it is to be understood that any other form of operating mechanism may be employed if desired. The crank handle 85 is fast on a sleeve 86 mounted on a rod 87 projecting from the right hand side frame 41 of the machine. The sleeve 86 is suitably journaled in the left hand side of the printer frame 88 to be described later. Fast on the left hand end of the sleeve 86 is a pinion 89 meshing with a gear 90 loosely mounted on a stud 93 projecting from the right hand side frame of the machine. The gear 90 meshes with a gear 94 fast on a stud shaft 95. A gear 92 also fast on the shaft 95 meshes with a gear 96 fast on the main drive shaft 97 which is journaled at its ends in the side frames of the machine. The gears 90 and 96 are of the same size as are also the gears 92 and 94 which are slightly larger than 90 and 96. The pinion 89 is one-half the size of gears 90 and 96 so that it requires two rotations of the crank handle 85 to impart one rotation to the main drive shaft 97. Fast on the gear 90 is a member 98. A bell crank lever 99 (Fig. 29) is pivotally mounted on the right hand side frame of the machine and one arm normally engages the radial edge 100 of the member 98 thereby locking the crank handle 85 against operation. The other arm of the lever 99 carries a roller 103 projecting into a cam slot 104 formed in a lever 105 fast on the right hand end of the shaft 60. The cam slot 104 is so constructed that when the lever 105 is rocked clockwise (Fig. 29) with the shaft 60 upon depression of a clerk's key as above described, the lever 99 is rocked counter-clockwise to move its arm out of engagement with the disk 98 to release the machine.

The transaction lever 80 (Fig. 4) is pivoted on a shaft 107 supported in the side frames 41 of the machine. A pinch lever 108 is pivoted on the lever 80 and this pinch lever and an arm 109 pivoted on the transaction lever carry a latch bar 110. The inner end of the latch bar 110 engages the outer edge of a curved link 113 which is pivoted at its lower end by a pin 111 on an arm 114 and at its opposite end is connected by a slot and pin connection 112 to a lever 115. The arm 114 is pivoted on a shaft 116 and the lever 115 is pivoted on the cross rod 74. The adjacent ends of the arm 114 and lever 115 are connected by a slot and pin connection 121. A rearwardly extending arm 117 of the lever 115 is provided with a pin 118 (Figs. 4 and 14) which projects under the rearwardly extending arm of a lever 119 pivoted on the cross rod 74. A spring 120 retains the lever 119 in normal position and a pin 123 mounted on a frame 124 supported by the cross rod 39 prevents the spring 120 from rocking the lever 119 clockwise (Fig. 4) past normal position. A spring 127, connected at one end to the pinch lever 108 and at its opposite end to the transaction lever 80, retains the pinch lever 118 in normal position and a spring 128, which is connected at one end to the arm 114 and at its opposite end to the lever 115, retains the arm 114 and the lever 115 in normal position. The lever 119 normally engages the pin 125 projecting from an arm 126 fast on the shaft 60.

From the above construction it can be seen that when the pinch lever 108 is operated the latch bar 110 is moved inwardly to depress the link 113 and thereby rock the lever 115 counter-clockwise about the cross rod 74. During this movement of the lever 115 the pin 118 rocks the lever 119 out of engagement with the pin 125 whereupon the spring 83 (Fig. 11) slightly rocks the shaft 60 clockwise until the pin 78 on the arm 79 abuts the rearwardly extending arm of the lever 70. While the pinch lever 108 (Fig. 4) is in operated position the outer end of the arm 117 of the lever 115 is in the path of movement of the pin 125, so that if a clerk's key is depressed while the pinch lever 108 is in operated position the shaft 60 cannot be rocked to effect release of the machine. When the pinch lever 108 is moved to normal position by its spring 127 upon being released the spring 128 restores the arm 114 and the lever 115 to normal position so that when the clerk's key is depressed the machine is released. When the pin 78 is in engagement with the arm 70, the arm 117 is not engaged by the pin 125 so that the position of the transaction lever 80 may be changed after it has been once adjusted and before a clerk's key is depressed. When the machine is released the pin 125 moves in between the lever 119 and the lever 117 thereby locking the transaction lever 80 against adjustment during operation of the machine. The forward beveled end of the latch bar 110 engages in the proper one of correspondingly shaped notches 130 formed in the frame 124 when the transaction lever 80 is in one of its positions. If the transaction lever is not in one of these positions the outer end of the latch bar 110 cannot engage in one of the notches 130 and therefore the machine is locked against operation as the arm 117 remains in front of the pin 125.

The keyboard also includes a cashier's lever 134 (Figs. 1B and 13) loosely mounted on the shaft 107. The cashier's lever 134 carries a pinch lever 135 and a latch bar 136 is mounted on the pinch lever 135 and a link 137. The rear end of the latch bar 136 engages a link 138 mounted on an arm 139 loose on the shaft 116 and on a lever 140 loose on the cross rod 74. A spring 143 retains the pinch lever 135 in normal position relative to the transaction lever and a spring 144 retains the arm 139, lever 140 and link 138 in normal position. The upwardly and rearwardly extending arm 145 of the lever 140 is provided with a flanged projection 146 (Figs. 11, 13 and 14) which, while the pinch lever 135 is in operated position, engages under a nose 147 (Fig. 11) on the arm 68, supporting the upper end of the plate 65 for the right hand bank of clerks' keys. It is obvious that while this projection 146 is under the nose 147 the clerks' keys are locked against operation and therefore it is necessary to move the cashier's lever to one of its four positions and release the pinch lever 135 before the machine can be operated. The outer beveled end of the latch bar 136 engages in the corresponding notch 151, formed in a frame 152 when the transaction lever is in one of its predetermined positions. When a clerk's key is depressed the outer end of the nose 147 moves into the path of the projection 146 thereby locking the cashier's lever against operation during operation of the machine. It is not necessary to adjust the lever 134 at each operation as it sometimes is desirable to allow the lever to remain at one position as long as the same cashier remains on duty.

Locks 141 (Figs. 1B and 13) are provided so that the machine can be operated only when the cashier's lever is in the position assigned to the cashier on duty or in its uppermost position. When a cashier goes off duty he operates his lock by a key retained in his possession so that the bolt 142 of the lock moves into the corresponding notch 151. Should the cashier's lever be moved by the cashier on duty to one of the other cashiers' positions the bolt 142 in the notch 151 prevents movement of the latch 136 to normal position and thereby locks the machine against operation.

Near the end of the operation of the machine the depressed amount keys 33 and department key 34 are released and the means for accomplishing this result will now be described. The forward end of the lever 105 (Fig. 29) is pivotally connected to the upper end of the pitman 148 which at its lower end is forked over the stud 93. Near the end of the operation of the machine the cam edge 149 of a block 150 fast on the gear 90 engages a roller 153 on the pitman 148. This cam edge 149 is so constructed that it lowers the pitman 148 to rock the lever 105 and shaft 60 counter-clockwise (Fig. 29) past normal position. Then when the cam edge 149 passes out of engagement with the roller 153 the spring 83 (Fig. 11) rocks the shaft 60 and lever 105 clockwise to normal position. Counter-clockwise movement of the lever 105 to normal position rocks the lever 99 to normal locking position. As the rod 58 (Fig. 7) is carried by the arms 59 fast on the shaft 60 this rod is moved down past normal position with the shaft 60 and engages projections 154 on the arms 45 supporting the upper ends of the detents 43 and forces the detents downward out of locking position. As the locking plates 44 are also moved to normal position by this movement of the rod 58 the key springs are permitted to restore the depressed amount and department keys to normal undepressed positions. When the shaft 60 is rocked counter-clockwise past normal position the spring 120 (Fig. 4) restores the lever 119 to normal position so that when the shaft 60 is rocked slightly clockwise to normal position the arm 119 is abutted by the pin 125 to arrest the shaft 60 in normal position.

When the shaft 60 is rocked counter-clockwise (Fig. 11) as above described, the pin 78 on the arm 79 is carried from under the rearwardly extending arm of the lever 70 whereupon the locking plates 65 for the clerks' keys are moved to normal position by their springs 66 to permit restoration of the depressed clerks' keys to normal position. When the depressed clerk's key moves to normal position the plate 63 for the bank in which the key is located is raised to normal position by its spring 54.

*Amount differential mechanism.*

To drive the amount differential mechanism of the machine the shaft 107 is provided with a plurality of driving segments 158 (Figs. 2^A, 8 and 10) one for each bank of amount keys and one for each of two amount differential units for the two additional totalizer elements. As is usual in the art there are provided totalizer elements for which no banks of amount keys are provided, these elements being of highest denominations, and operated in adding operations only when transfers to them are necessary, and in the present form of embodiment two of these additional totalizer elements and amount differential units are provided. These additional differential units and the transfer devices associated therewith are like those for the banks of amount keys, the transfer devices being used to effect transfers to the two additional totalizer elements in adding operations and the differential units being controlled by these two additional totalizer elements in total and subtotal printing operations.

The shaft 107 is rocked first clockwise (Fig. 13) and then counter-clockwise to normal position by the following described means. Fast on the shaft 107 is an arm 151 which is pivotally connected to the upper end of a pitman 152, which near its lower end is provided with a slot 155 through which the main drive shaft 97 projects. The shaft 97 is provided with two cams 156 and 157 which coöperate with rollers 161 and 162 respectively carried by the pitman 152. The cams 156 and 157 are so constructed that during each operation of the machine the shaft 107 is rocked clockwise about 90°, retained in this position for a short time and then rocked counter-clockwise to normal position.

Loosely mounted on the shaft 107 (Figs. 7 and 8) and adjacent the corresponding driving segments 158 are differentially movable members 159 carrying actuating racks 160 and transfer arms 163 for operating the totalizer pinions 164. The driving segments 158 are connected to the differentially movable members 159 by latches 165 (Figs. 8 and 10) each of which is supported by an arm 166 and a lever 167 pivoted on the corresponding differentially movable member. Springs (not shown) retain the rear ends of the latches 165 in engagement with the shoulders 171 on the driving segments 158. When the segments 158 are rocked clockwise with the shaft 107 the differentially movable members 159 for the banks of amount keys are carried up with their latches to points where the forwardly extending arms of the levers 167 engage the depressed amount keys. Such engagement results in disengagement of the latches from the driving segments 158 and engagement of the forward ends of the latches in the particular notches 169 (Fig. 7) opposite the latches at the time and formed in plates 170 fast on the key frames. Upon return movement of the driving segments 158 to normal position the latches 165 connect the differentially movable members thereto and return the latter to zero position. In order to insure movement of the differentially movable members 159 to normal position with the segments 158 projections 173 (Fig. 8) on the segments engage rollers 174 on the differentially movable members.

When no amount key is in depressed position in a bank the zero stop pawl 53 (Fig. 7) for that particular bank operates the latch 165 to arrest the differentially movable member 159 in zero position, the differentially movable members being moved an additional step from normal to zero position for the purpose of effecting transfers as will be described later. When a key is depressed, however, the arm 46 through its engagement with the pin 50 on the zero stop pawl 53 moves the latter out of operative position. During adding operations the zero stop pawls 53 for the two additional differential units of highest denominations arrest the corresponding differentially movable members 159 in zero position.

Totalizer.

The machine is provided with one totalizer which is actuated to add amounts only when "cash" transactions are entered in the machine.

Figure 16:
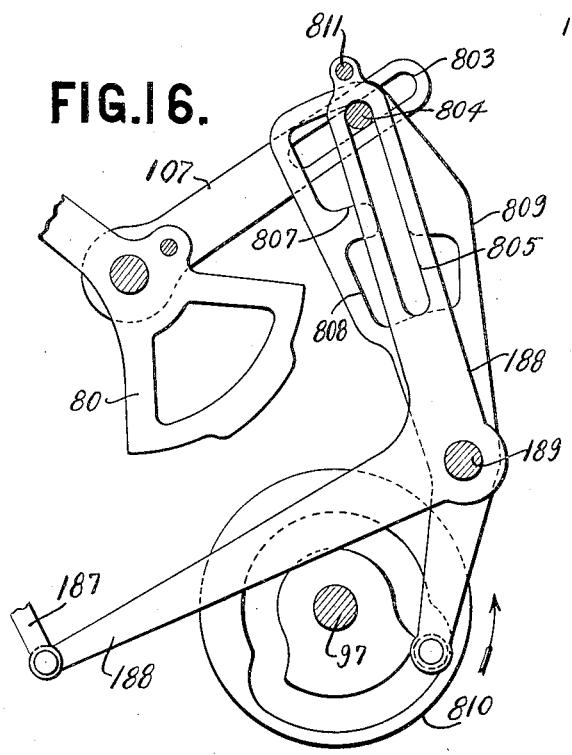
Fig. 16 is a detail side view of the mechanism for effecting engagement of the totalizer with the actuating mechanism during adding operations.

The totalizer comprises a plurality of totalizer pinions 164 (Figs. 7 and 8) loosely mounted on a tube 176 supported at its ends in plates 177 (Figs. 4, 7 and 11). The upper ends of the plates 177 are forked to straddle sleeves mounted on the shaft 107. Near their lower ends the plates 177 carry a shaft 179 the ends of which project into slots 180 (Figs. 4 and 13) formed in plates 183 fast on the side frames 41 of the machine. Fast on the shaft 179 near its ends are arms 184 carrying rollers 185 projecting into cam slots 186 formed in the plates 183. The left hand arm 184 (Figs. 4 and 16) is pivotally connected by a link 187 to a bell crank lever 188 pivoted on a rod 189 supported by the side frames of the machine. During operations in which a "cash" transaction is entered the lever 188 is rocked clockwise (Fig. 4) after the differentially movable members 159 have been positioned differentially and before they begin their return movement to normal position. This movement of the lever 188 rocks the arms 184 and shaft 179 and at the same time the movement of the rollers 185 in the cam grooves 186 raises the totalizer into engagement with the actuating racks 160. During return movement of the actuating racks the amount set up on the amount keys is added onto the totalizer and then after the actuating racks have been restored the lever 188 is rocked counter-clockwise (Fig. 4) to normal position to move the totalizer out of engagement with the actuating racks.

An alining plate 190 (Fig. 7) carried by two levers 193 fast on a shaft 194 supported in the plates 177 engages the totalizer pinions 164 to prevent their rotation when out of engagement with the actuating racks, as fully shown and described in the above mentioned copending application of Wm. A. Chryst. Cams 195 are fast on the shaft 179 and coöperate with the levers 193 to rock the plate 190 out of engagement with the totalizer pinions when the shaft 179 is rocked to move the totalizer to engagement with the actuating racks 160. When the totalizer is moved out of engagement with the actuating racks the cams 195 move the plate 190 back into normal engagement with the totalizer pinions.

Transfer mechanism.

Pairs of teeth 200 (Fig. 8) are cut in the transfer arms 163 and are mounted in alinement with the actuating racks 160. The arms 163 are pivoted at 201 on the members 159 and are movable relatively to the racks to provide for transferring. Pivoted on the transfer arms 163 by pins 203 are levers 204 having pins 205 normally engaging shoulders 206 on the differentially movable members 159. Springs 207 are connected at their forward ends to the levers 204 and at their rear ends to the members 159 and normally retain pins 208 on the levers 204 in engagement with the outer ends of projections 209 on the forward ends of levers 210 which are loosely mounted on a cross rod 213 supported at its ends in the side frames of the machine. During the one step of movement of the differentially movable members 159 from normal to zero position the transfer arms 163 are not moved but when the members arrive at zero position the forward ends of the racks 160 engage the transfer arms so that during continued movement of the members the transfer arms move with them. Upon movement of the pins 208 out of engagement with the levers 210 the springs 207 rock the levers 204 to move the pins 205 into engagement with recesses 214 adjacent the shoulders 206 formed in the differentially movable members 159 for the purpose of latching the transfer arms and the members together. During return movement of the differentially movable members 159 to normal position the pins 208 on the levers 204 again engage the projections 209 on the levers 210, if the latter have not been moved out of normal position, thereby arresting the transfer arms 163 in zero position while the racks 160 with the members 159 move one step past zero to normal position. When the pins 208 engage the projections 209 the levers 204 are rocked to disconnect the differentially movable members from the transfer arms.

Springs 216 tend to rock the levers 210 clockwise (Fig. 8) but such movement is normally prevented by engagement of pins 217 on the upper ends of corresponding levers 218 with shoulders 219 formed in slots 220, which are cut in the levers 210. Springs 223 normally retain the levers 218 in the position shown in Fig. 8. Pivotally mounted at 224 on the levers 210 are levers 225 (Figs. 8 and 9) which at their lower ends carry pins 226 engaging the curved edges 227 of the levers 218. Pins 228 mounted on the upper ends of the levers 225 engage the levers 210 to prevent clockwise movement (Fig. 8) of the levers 225 past normal position. The totalizer pinions 164 are provided with long teeth 229 which when the totalizer pinions pass from their "9" to their "0" positions or beyond engage projections 230 on the levers 225 thereby rocking the latter counter clockwise about their pivots 224. The pin 226 on the lever 225 operated by a pinion of one denomination engages the curved edge 227 of the lever 218 retaining the lever 210 for the transfer arm 163 of the pinion of next higher denomination in normal position. That is to say, the pin 226 on the lever 225 operated by the units pinion engages the lever 218 retaining the lever 210 for the transfer arm 163 for the tens pinion in normal position; the pin 226 on the lever 225 operated by the tens pinion engages the lever 218 retaining the lever 210 for the transfer arm 163 for the hundreds pinion in normal position, and so on across the transfer mechanism.

From the above description it can be seen that when a totalizer pinion passes from its "9" position to its "0" or beyond its long tooth 229 engages the projection 230 thereby rocking the lever 225 counter clockwise (Fig. 8). This movement of the lever 225 through its pin 226 rocks the lever 218 appropriate to the transfer arm 163 for the pinion of next higher order counter clockwise against the action of its spring 223 to disengage the pin 217 from the shoulder 219 in slot 220 whereupon the spring 216 rocks the corresponding lever 210 clockwise until movement of the latter is arrested by engagement of the lower end of the slot 220 with the pin 217. It can be seen that when the lever 210 is in moved position the pin 208 on the transfer arm 163 does not engage the projection 209 and therefore, during return movement of the differentially movable member the transfer arm 163 moves with the rack 160 one step past zero position to effect the transfer.

From the above description it is obvious that the levers 210 are tripped during the direct actuation of the totalizer pinions by the actuating racks 160 so that when the actuating racks are restored to normal position the transfer arms 163 move an additional unit with the actuating racks past zero position to effect the transfers. It frequently happens in the operation of totalizing mechanism that a transfer to one totalizer pinion necessitates a transfer to the pinion of next higher order. Whenever a transfer from one totalizer pinion to another causes the latter pinion to render effective the transfer device for the totalizer pinion of next higher order it is necessary that the pinion to which the first transfer is made should stand one step removed from the transferring point which in the decimal system herein shown is at "9." For example, if 199 stands on the totalizer and "1" is added on the units wheel the transfer from the units pinions to the tens pinion necessitates a transfer from the tens pinion to the hundreds pinion so that the totalizer will have "200" standing thereon at the end of the operation. The totalizer pinion 164 in Fig. 8 is shown in its "9" position and the pinion is shown in dotted lines as being in engagement with the teeth 200 on the corresponding transfer arm 163. In accordance with the example above, let it be assumed that this pinion is the tens pinion. When the units pinion passes from its "9" to its "0" position the lever 210 for the tens pinion is tripped so that the transfer arm 163 for the tens pinion is moved one step past zero position with the actuating rack 160 to add "1" on the tens pinion during movement of the tens differential unit to normal position. As the tens pinion is in its "9" position when the corresponding lever 210 is rocked clockwise the projection 230 on the lever 225 carried by this lever 210 engages the long tooth 229 of the tens pinion, thereby rocking the lever 225 to effect the tripping of the lever 210 for the hundreds pinion so that the transfer arm 163 for the hundreds pinion moves one step past its normal position with the corresponding actuating rack 160 to add "1" on the hundreds pinion.

During differential movement of the differentially movable members 159 from zero position the levers 210 that have been tripped during the preceding operation are restored to normal position by mechanism now to be described.

A cross rod 233 (Figs. 2ᴬ and 7) is supported at its left hand end in an arm 234 and at its right hand end in an arm 235 (Fig. 12). The arms 234 and 235 are fast on a sleeve 236 loosely mounted on a shaft 237 journaled at its ends in the side frames 41 of the machine. The arm 235 carries a roller projecting into a cam groove formed in the face of a disk 238 fast on the main drive shaft 97. The cam groove in the disk 238 is so constructed that during differential movement of the members 159 from zero position the arms 234 and 235 are rocked clockwise (Fig. 7) to raise the cross rod 233. During this movement of the cross rod 233 it engages rearwardly extending arms 239 (Figs. 7 and 8) of the tripped transfer levers 210 thereby rocking the latter to normal position against the action of their springs 216 (Fig. 8). When the levers 210 are restored to normal position the springs 223 operate the corresponding levers 218 to latch the levers 210 in normal position when the cross rod 233 is restored to normal position.

Operation of amount differential mechanism during total and sub-total printing operations.

To print a sub-total, the totalizer (Figs. 7 and 8) is moved into engagement with the teeth on the transfer arms 163 before the differentially movable members 159 are moved from normal position and are retained in engagement with the teeth on the transfer arms and the actuating racks 160 while the differentially movable members are moved differentially under the control of the totalizer pinions and then returned to normal position, the disengagement of the totalizer being effected after the differentially movable members have been returned to normal position. In total printing operations the totalizer is moved into engagement with the teeth on the transfer arms 163 at the same time as in sub-total printing operations but as the totalizer is to be left at zero it is disengaged from the actuating racks 160 before the differentially movable members begin their return movement to normal position.

The operation of the totalizer elements and their control over the differentially movable members in such operations will now be described and the mechanism for controlling the time of engagement of the totalizer with the actuating racks will be described later.

In total and sub-total printing operations movement of the differentially movable members 159 is determined by the long teeth 229 on the totalizer pinions. These long teeth, when the pinions arrive at zero, engage pawls 243 (Figs. 8 and 9) which are loosely mounted on the shaft 221. The pawls 243 are pivoted at 244 to links 245 which together with links 246, pivoted at their rear ends on levers 247, form toggles. The levers 247 are loosely mounted on the cross rod 213. Fast on the shaft 221 are rearwardly extending arms 248 which at their rear ends have notches engaging over pins pivotally connecting the pairs of links 245 and 246. The shaft 221 and the arms 248 are rocked clockwise (Fig. 8) in a manner to be described presently when the totalizer is moved into mesh with the teeth on the transfer arms 163 during total and sub-total printing operations, whereupon the pawls 243 are moved into the path of movement of the long teeth 229 on the totalizer pinions. When a totalizer pinion arrives at zero its long tooth 229 engages its appropriate pawl 243 to rock the latter counter clockwise (Figs. 7 and 8). This movement of the pawl 243 through the links 245 and 246 rocks the lever 247 counter clockwise against the action of its spring 249 (Figs. 7 and 9) causing a flat sided pin 250 (Fig. 8) thereon to engage one of a series of teeth 253 formed in the rear end of a corresponding frame 254. The frames 254 are loosely mounted on the shaft 107 beside the corresponding differentially movable members 159, and at their forward ends are provided with notches engaging over pins 255 carried by the bell crank levers 167 pivoted on the members 159. By this arrangement when a totalizer pinion arrives at zero and its respective frame 254 is stopped by the pin 250 the first thing that occurs is a slight relative movement between the frame 254 and the differentially movable member 159 thus causing the lever 167 to rock counter clockwise and disengage the latch 165 from the corresponding driving segment 158.

After the actuating racks 160 have been differentially positioned under the control of the totalizer pinions and before they begin their return movement to normal position the shaft 221 and arms 248 are rocked counter clockwise (Fig. 8) to normal position thereby rocking the levers 247 to normal position to permit movement of the differentially movable members 159 and frames 254 to normal position.

The means for rocking the shaft 221 and arms 248 during total and sub-total printing operations will now be described.

A lever 257 (Fig. 4) is fast on a sleeve 258 loosely mounted on the cross rod 213. The lever 257 carries two rollers 259 engaging the rear end of the transaction lever 80. Fast on the sleeve 258 is an arm 260 (Fig. 5) provided with a curved slot 263 through which a pin 264 projects. The pin 264 also projects through an L-shaped slot 265 (Fig. 6) formed in an arm 266 fast on the shaft 221 and through a slot 267 (Fig. 5) formed in the upper end of a lever 268 loosely mounted on the shaft 221. The slot 263 is concentric with the shaft 221 and normally coincides with the curved portion 269 of the slot 265 formed in the arm 266. The slot 267 is concentric with the cross rod 213 and normally coincides with the portion 270 (Fig. 6) of the slot 265. The lower end of the lever 268 is pivotally connected to the forward end of a pitman 274 which at its rear end is forked to straddle the main drive shaft 97. The pitman 274 carries a roller projecting into a cam groove formed in the face of a disk 275 fast on the main drive shaft 97. This cam groove is so constructed that the lever 268 is rocked first clockwise (Fig. 5) and then counter clockwise to normal position during each operation of the machine, the lever 268 being rocked clockwise at the time the totalizer is moved into engagement with the actuating racks during total printing operations and counter clockwise to normal position at the time the totalizer is moved out of engagement with the actuating racks during total printing operations.

During operations in which the transaction lever is one of its four lower positions the pin 264 moves idly in the slot 263 and in the portion 269 of the slot 265. The transaction lever 80 (Fig. 4) is constructed so that when it is adjusted to its total or sub-total printing position the lever 257 is rocked counter clockwise by the engagement of the cam surface 276 on the rear end of the transaction lever with the front roller 259. This movement of the lever 257 through the sleeve 258 rocks the arm 260 (Fig. 5) in the same direction thereby lowering the pin 264 in the slot 267 and in the portion 270 of the slot 265. (Fig. 6.) It is evident that when the pin 264 is in this lowered position the arm 266 and shaft 221 are rocked with the lever 268 thereby straightening and breaking the toggles 245 and 246 through the medium of the arms 248 and rocking the pawls 243 (Fig. 8) into and out of operative position during total and sub-total printing operations. When the transaction lever 80 (Fig. 4) is adjusted from its total or sub-total printing position to one of its other positions the cam portion 278 of its rear end engages the rear roller 259 thereby rocking the lever 257 the sleeve 258 and the arm 260 to normal position to raise the pin 264 to its normal position.

When the transaction lever is adjusted to its total or sub-total printing position the zero stop pawls 53 (Fig. 7) for the differentially movable members 159 are rocked out of operative position so that the members 159 may be controlled by the totalizer pinions. To this end a cross rod 280 (Fig. 7) is mounted at its ends in arms 283 fast on the shaft 116. A downwardly extending arm 284 (Fig. 4) is connected by a link 285 to a downwardly extending arm 286 loose on the shaft 221. The arm 286 is provided with three teeth meshing with teeth formed on the forward end of the lever 257. When the lever 257 is rocked counter clockwise by the adjustment of the transaction lever to its total or sub-total printing position the shaft 116 is rocked clockwise through the arm 286, link 285 and arm 284, thereby lowering the cross rod 280 (Fig. 7). During this movement of the cross rod 280 it engages the forwardly extending tails 287 on the zero stop pawls 53 for the members 159 thereby rocking these zero stop levers out of operative position.

When the cross rod 280 is lowered it is positioned in front of the downwardly extending projections 288 formed on the arms 46 supporting the lower ends of the detents 43 for all of the banks of keys except the right hand bank of clerks' keys, thereby locking the keys in these banks against operation. During total and sub-total printing operations a clerk's initial and the numbers of the department and cashier are not printed and therefore only the special key 37, which as above stated, is positioned in the right hand bank of clerks' keys is depressed to release the machine in the same manner as depression of a clerk's key releases the machine when a transaction is to be entered in the machine. When an amount key 33, a department key 34 or the number key 36 is depressed the shoulder 281 (Fig. 7) on the arm 46 operated thereby moves under the cross rod 280 thereby preventing adjustment of the transaction lever to its total or sub-total printing position.

*Totalizer engaging mechanism.*

Rigidly connected to the transaction lever 80 (Figs. 2A, 4, 15 and 16) and loose on the shaft 107 are two arms 800 provided with slots 803 through which a pin 804 projects. The pin 804 also projects through slots 805 formed in the upwardly extending arm of the lever 188 and in an arm 806 loosely mounted on the cross rod 189. The lever 188 and arm 806 are rigidly connected at their upper ends by a pin 811. When the transaction lever 80 is adjusted to its "cash" position the pin 804 is lowered in slots 805 and is positioned between a projection 807 (Fig. 16) and the rear side of a slot 808 formed in a lever 809 loosely mounted on the cross rod 189. The downwardly extending arm of the lever 809 carries a roller projecting into the face of a disk 810 rigidly mounted on the main drive shaft 97. The cam groove in the disk 810 is so constructed that when the pin 804 is between the projection 807 and the rear side of the slot 808 the lever 188 is rocked clockwise (Fig. 16) with the lever 809 and arm 806 to move the totalizer into engagement with the actuators when adjusted and before the latter begin their return movement to normal position. Then while the actuators are in moved position the levers 809 and 188 and arm 806 are rocked to normal position to move the totalizer out of engagement with the actuators. During movement of the lever 188 the pin 804 moves in the slots 803 formed in the arms 800.

When the transaction lever 80 is adjusted to its "sub-total" position the pin 804 is moved down from behind the projection 807 into position between two projections 813 (Fig. 4) which project into a slot 814 formed in a lever 815 loose on the cross rod 189. The lower end of the lever 815 carries a roller 816 projecting into a cam groove 817 formed in the right hand face of a disk 818 which is fast on the main drive shaft 97. This cam groove 817 is so constructed that when the pin 804 is positioned between the projections 813 the lever 188 is rocked clockwise (Fig. 4) with the lever 815 to move the totalizer into engagement with the actuators before they begin their movement from normal position. Then after the actuators have been restored to normal position the levers 188 and 815 are rocked to normal position thereby moving the totalizer out of engagement with the actuators.

When the transaction lever 80 is moved to its "total" position the pin 804 is moved into engagement with a setoff 821 in the lower end of a slot 820 (Fig. 3) formed in a lever 823 loosely mounted on the shaft 189. The downwardly and forwardly extending arm 824 (Fig. 4) of the lever 823 carries a roller 825 projecting into a cam groove 826 formed in the left hand face of the disk 818. The cam groove 826 is so constructed that when the pin 804 is in engagement with the setoff 821 of the slot 820 the levers 188 and 823 are rocked to move the totalizer into engagement with the actuators before they begin their movement from normal position and out of engagement therewith after the actuators have been positioned differentially.

It is understood, of course, that when one of the three levers 809, 815 and 823 is operated to effect engagement and disengagement of the totalizer with the actuators the other two are rocked idly, the three levers being rocked upon each operation of the machine.

When the transaction lever 80 is in its "charge", "C. O. D." or "number" position the left hand end of the pin 804 engages in a slot formed in a plate 829 (Fig. 4) fast on the left hand side frame 41 of the machine thereby positively locking the lever 188 against operation, it being understood, of course, that when the transaction lever is in one of these three positions the totalizer is not to be moved into engagement with the actuators. The slot in the plate 829 normally coincides with the upper portion of the slot 805 in the lever 188.

*Printing mechanism.*

The printing mechanism comprises a set of amount type carriers 290 (Figs. 2ᴮ and 32), a transaction type carrier 291, a cashier's type carrier 292, two clerks' type carriers 293, a department type carrier 294, type carriers 295 of a consecutive numbering device and type carriers 296 for printing the date. As shown in Fig. 29 the type carriers have two sets of type the upper set being employed to print on a detail strip 299 and the lower series on sales slips inserted into the machine. The right hand or units amount type carrier 290 is fast on a shaft 297 (Fig. 32) journaled at its right hand end in the right hand printer frame 88. The other amount type carriers are fast on the right hand ends of nested sleeves 298 loosely mounted on the shaft 297. The transaction type carrier 291 is fast on the outermost sleeve 298 which is journaled in the left hand printer frame 88. The other type carriers are loosely mounted on the outermost sleeve 298.

Fast on the left hand end of the outermost sleeve 298, which carries the transaction type carrier 291, is a gear 300, meshing with a segment gear 303 (Figs. 2ᴮ, 29 and 32) fast on the right hand end of a shaft 304. Rigidly mounted on the shaft 304 near its left end is a segment gear 305 (Figs. 2ᴬ and 4) which is connected by a link 306 to the transaction lever 80. Through these connections it can be seen that when the transaction lever is adjusted the transaction type carrier 291 is rotated a corresponding extent into position to print a character designating the class of transaction or a total or sub-total printing operation.

Fast on the left hand ends of the remaining sleeves 298 (Fig. 32) and the shaft 297 carrying the amount type carriers 290 are gears 307 meshing with segment gears 308 fast one the right hand ends of corresponding sleeves 309 which are nested and loosely mounted on the shaft 304. Fast on the left hand ends of the sleeves 309 appropriate to the amount type carriers are segment gears 310 (Figs. 2ᴬ and 7). The segment gears 310 are connected by links 313 to the forward ends of beams 314 pivoted at their rear ends by pins 316 on the differentially movable members 159. When the members 159 are moved differentially the rear ends of the beams 314 are moved with the members and then while the members are in their differentially moved positions a cross rod 315 is moved by means to be described presently, to force the beams 314 in engagement with the hubs of members 159, if the beams are not already in engagement therewith. When the beams 314 are moved into engagement with the hubs of the members 159 the forward ends of the beams 314 are moved differentially in accordance with the position of the members 159 whereby, through the above described connections, the amount type carriers are moved directly from the positions to which they were adjusted at the preceding operation to the positions corresponding to the depressed amount keys, so that the amount set up on the amount keys is printed by the amount type carriers.

The cross bar 315 is supported at its ends in arms 317 (Figs. 2ᴬ—2ᴮ, 7 and 11) fast on the shaft 237. Rigidly mounted on the shaft 237 is a downwardly extending arm 318 (Fig. 11) which at its lower end carries a roller projecting into a cam groove 319 formed in the face of a disk 320 fast on the main drive shaft 97. This cam groove 319 is so constructed that while the members 159 are in their differentially moved position the shaft 237 and arms 317 are rocked counter clockwise to lower the cross rod 315 and thereby move the beams 314 into engagement with the hubs of the members 159. Then before the members 159 begin their return movement to normal position the cross rod 315 is moved out of engagement with the beams 314.

A gear 323 fast on the cashier's type carrier 292 (Fig. 32) meshes with a gear 324 fast on a shaft 325 supported in the printer frames 88. Fast on the left hand end of the shaft 325 is a gear 326 meshing with a gear 327 loosely mounted on the hub of the gear 307 fast on the shaft 297. The gear 327 meshes with the segment gear 328 which is rigidly mounted on the outermost sleeve 309. Fast on the right hand end of this outermost sleeve 309 is a segment gear 330 (Fig. 13) which is connected by a link 333 to the cashier's lever 134. Through these connections the cashier's type carrier 292 is directly adjusted by the movement of the cashier's lever 134.

Rigidly mounted on the clerks' type carriers 293 (Fig. 32) are gears 334 which mesh with gears 335 fast on the right hand ends of the two innermost nested sleeves 336 loosely mounted on the shaft 325. Rigidly mounted on the left hand ends of the sleeves 336 carrying the gears 335 are gears 337. The gears 337 mesh with gears 338 which in turn mesh with segment gears 339 fast on the right hand ends of the two corresponding sleeves 309. Rigidly mounted on the left hand ends of the sleeves 309 carrying the segment gears 339 are segment gears 340 (Figs. $2^B$ and 11). The segment gears 340 are connected by links 343 to the forward ends of beams 344 pivotally mounted at their rear ends on corresponding levers 345 loosely mounted on the shaft 107. Latches 346 are mounted on the forward ends of the levers 345 and these latches have the same construction as the latches 165 (Fig. 8) for the banks of amount keys and are mounted on the arms 345 in the same manner as the latches 165 are mounted on the differentially movable members 159. The arms 345 are moved differentially under the control of the clerks' keys by driving segments 347 fast on the shaft 107. While the arms 345 are in differentially moved positions the cross rod 315 moves the beams 344 into engagement with the hubs of the arms 345 if the beams are not already in engagement therewith, thereby adjusting the clerks' type carriers 293 to their proper positions through the above described connections.

Fast on the department type carrier 294 (Fig. 32) is a gear 348 meshing with a gear 349 mounted on the corresponding sleeve 336. Fast on the left hand end of this sleeve 336 is a gear 350 meshing with a gear 353 which in turn meshes with a segment gear 354 fast on the right hand end of the corresponding sleeve 309. Rigidly mounted on the left hand end of this sleeve 309 is a segment gear 355 (Fig. $2^A$). The differential mechanism for positioning the segment gear 355 is controlled by the banks of department keys and has the same construction as that controlled by the clerks' keys (Fig. 11). As the differential mechanism for the bank of department keys is like that for the banks of clerks' keys the same reference numerals have been applied in Fig. $2^A$ to the corresponding parts. When the beam 344 for the bank of department keys is moved into engagement with the hub of the corresponding arm 345 it can be seen that the department type carrier 294 is positioned accordingly through the above described connections.

After the segment gears 305 (Fig. 4), 310 (Fig. 7), 355 (Fig. $2^A$), 340 (Fig. 11) and 330 (Fig. 13) have been adjusted differentially they are alined and locked in their adjusted positions until during the next operation of the machine, thereby alining the corresponding type carriers. To this end arms 357 (Figs. 7 and 11), one for each of the above mentioned segment gears is fast on a shaft 358 and at their forward ends have noses 359 normally engaging between teeth on the segment gears. Fast on the shaft 358 is a rearwardly extending arm 360 (Fig. 7) carrying a roller projecting into a cam groove formed in the face of a disk 363. This cam groove is so constructed that the shaft 358 and arms 357 are rocked counter clockwise near the beginning of the operation of the machine to permit adjustment of the type carriers. Then after the type carriers have been differentially positioned and while the cross rod 315 is in moved position the shaft 358 and arms 357 are rocked clockwise to normal position thereby moving the noses 359 of the arms 357 into engagement with the teeth on the above mentioned segment gears to lock and aline the segment gears and corresponding type carriers in adjusted positions.

Rigidly mounted on the type carriers 295 (Fig. 32) of the consecutive numbering device are ratchets 364 (Figs. 29 and 32) engaged by a multi-prong operating pawl 365 having the usual well known construction. This pawl 365 is pivotally mounted on an arm 366 loosely mounted on one of the sleeves 336. A cross rod 367 projects through the arm 366 and is supported at its ends in arms 368. The arms 368 are connected by links 369 connected at their upper ends by pins 370 to the forward ends of arms 373 and 374 (Figs. $2^B$ and 29) rigidly mounted on a shaft 375 supported in the sides of the printer frame 88. Fast on the shaft 375 is a rearwardly extending arm 376 which on its rear end carries a roller projecting into a cam groove 377 formed in the right hand face of a disk 378 fast on the main drive shaft 97. This cam groove 377 is so constructed that the arm 366 is rocked counter clockwise (Fig. 29) when a printing impression is taken on the detail strip 299 and then rocked clockwise to normal position. During clockwise movement of the arm 366 the pawl 365 operates the consecutive numbering device to add "1" as is well understood in the art.

The date type carriers 296 (Fig. 32) carry gears 380 meshing with gears 383 fast on the corresponding sleeves 336, which at their opposite ends, carry gears 384 meshing with the teeth on manually adjustable rack bars 385 (Figs. 2ᴮ, 30 and 32). The rack bars 385 are provided with slots 386 (Fig. 30) through which a plate 387 fast on the printer frame 88 projects, the rack bars being guided in this manner. The rack bars 385 are provided with knobs 388 by which the rack bars are adjusted after a lid 389 (Figs. 1ᴬ—1ᴮ) hinged at its bottom edge and locked by key 1389 forming the front of the cabinet of the machine is opened. Flanges 391 on the rack bars 385 have characters, which may be viewed through an opening 392 (Fig. 1ᴮ) formed in the lid 389.

The rack bar 385 for the tens of days carrier is constructed differently from the rack bars for the other carriers. This rack bar for the tens of days carrier is connected by a cross piece 393 (Figs. 30 and 33) to a slide 394 which is similar to the rack bars for the other date type carriers except that it is not provided with teeth. The slide 394 is mounted between the years and units of days racks 385 and the rack connected thereto is between the months and units of days racks. It is obvious that this arrangement is employed so that the units and tens of days type carriers print in the proper order and the flanges 391 on the units of days rack and the slide 394 appear in proper order to the operator. The rack bars 385 are alined in their adjusted positions by pawls 396 (Fig. 30) which are operated by springs 397 compressed between the pawls 396 and a rod 398.

The detail strip 299 (Figs. 29 and 31) is fed from a supply roll 400 about a platen 403 and thence onto a storage roll 404. The storage roll 404 is mounted on the arm 373 and the platen roll is loose on a rod 405 supported in the arms 373 and 374. The supply roll 400 is mounted on the left hand printer frame 88. When the arms 373 and 374 are rocked counter clockwise by the cam groove 377, as above described, the detail strip 399 is carried into engagement with the upper printing line of the group of type carriers by the platen 403 to print the data set up on the type carriers on the detail strip.

Fast on the storage roll 404 is a ratchet 406 engaged by a pawl 407 loosely mounted on the printer frame and held in position by a spring 408. When the storage roll 404 is lowered the pawl 407 engages behind the next succeeding tooth of the ratchet 406 so that when the roll is elevated to normal position it is rotated one step to feed the detail strip one space. A retaining pawl 409, mounted on the arm 373, is retained in engagement with the ratchet 406 by the leaf spring 410 to prevent retrograde movement of storage roll 404.

The inking ribbon 413 through which the type carriers print upon the detail strip and the sales slip is fed in any desired manner from a supply roll 414 about the type carriers and thence onto a storage roll 415. The ribbon is guided by cross rolls 416 mounted in the printer frames.

The sales slips, which have the usual form, are inserted through an opening 417 (Fig. 1ᴮ) formed in the printer hood 418 and onto a stationary table 419 (Fig. 29) supported in the printer frame. The right hand sides of the printer frame and the printer hood are provided with slots 421 (Fig. 1ᴮ) to accommodate slips which are wider than the table 419. The table 419 at its forward end is inclined downwardly and forwardly to facilitate the insertion of the slips into the machine. During operation of the machine and after the type carriers have been differentially positioned an arm 420 carrying a platen 423 is operated to print from the lower printing line of the type carriers on the duplicate portion of a folded sales slip which projects below the original portion of the sales slip, as is well understood. Then the sales slip is moved forwardly, as hereinafter described, and the arm 420 again operated to print on the original portion of the sales slip. The arm 420 is fast on a shaft 423 supported in the printer frame. A rearwardly extending arm 424, fast on the shaft 423, carries a roller projecting into a cam groove 425 formed in the left hand face of the disk 378. This cam groove 425 is so constructed that the arm 420 is operated twice to print upon the original and duplicate portions of the sales slip, as above stated.

After a printing impression has been taken upon the duplicate portion of the slip the slip is fed forward one step by coöperating feed rollers 427 and 428. The feed roller 428 is fast on a shaft 429 journaled in the printer frame. A gear 430 fast on the shaft 429 meshes with a gear 433 which is loose on the shaft 423 and meshes with a gear 434 fast on a stud shaft 435. A gear 436 also fast on the stub shaft 435 meshes with the gear 94 fast on the stub shaft 95. The ratio of this gearing is such that upon each complete operation of the machine the feed roller 428 is given one complete rotation in the direction of the arrow. Immediately after a printing impression has been taken upon the duplicate portion of the sales slip a feeding flange 438 of the roller 428 cooperates with the roller 427 to feed the original portion of the sales slip into printing position.

*Punching mechanism.*

The record strip 447 herein shown (Fig. 23) is arranged to be perforated to represent the amount and class of a transaction as well as the clerk making the sale, the department in which it is made and the cashier having supervision of the department. This record strip after the day's business or any desired time is run through an auditing machine such as that shown in the above mentioned co-pending application filed by the present applicant.

The mechanism for perforating this record strip will now be described. Perforating punches 440 (Figs. 7, 21 and 24) at their forward ends are slidably mounted in a frame 443, mounted at its ends in the upwardly extending arms of levers 444. The rear ends of the punches 440 are slidably mounted in a plate 441 fast on the frame 443. Springs 442 coiled about the punches 440 and compressed between the frame 443 and shoulders 439 on the punches retain the latter in normal position. The levers 444 are provided with hubs 445 (Figs. 27 and 28) journaled in frames 446, rigidly mounted on the base of the machine. The record strip 447 (Figs. 21, 23 and 27) passes between the frame 443 (Figs. 21, 24 and 25) and a frame 448 also carried by the levers 444. When the selected punches 440 are operated, as will be described later, they are forced through the record strip and into corresponding holes 449 (Figs. 24 and 27) formed in the frame 448 and a plate 450 (Fig. 24) fast on the frame 448.

As the punches 440 register with the corresponding holes 449 the arrangement of the holes 449 in Fig. 27 clearly shows the arrangement of the punches. The uppermost row of punches comprises three punches representing the different classes of sales, three cashiers' punches, a punch controlled by the number key 37 and seven punches controlled by the department keys. The middle row of punches is controlled by the two banks of clerks' keys and the bottom row is controlled by the amount keys. There are five amount punches for each bank of amount keys and upon each operation of the machine two of the five punches representing one denomination are operated to represent the digit corresponding to the key depressed.

Figure 23:
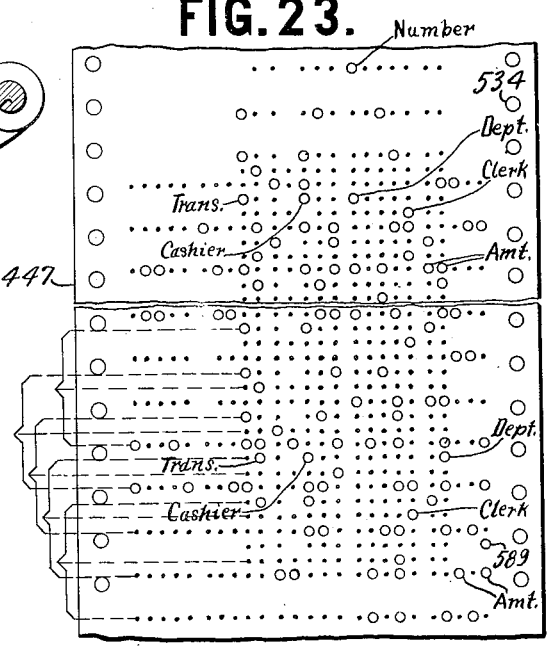
Fig. 23 is a top plan view of a portion of the perforated record strip.

A portion of the record strip perforated by the machine of the present invention is shown in Fig. 23. The dots represent the index positions at which the strip may be perforated by the punches 440. The means for feeding the record strip is constructed to feed the strip three-fourths the distance between two adjacent rows of punches 440 upon each operation of the machine. It can be seen therefore that there are three rows of index positions between the first and second and the second and third rows of index positions perforated to represent the data of one complete sale. The brackets connecting the dash lines indicate the rows of the perforations representing various sales, there being one bracket for each sale.

The segment gears 310 (Fig. 7) moved differentially under the control of the banks of amount keys mesh with pinions 454 (Figs. 7 and 17) which are fast on the left hand ends of corresponding sleeves 455, one for each bank of amount keys and loosely mounted on the cross rod 456 supported at its ends in the side frames 41 in the machine. Rigidly mounted on each of the sleeves 455 is a series of five disks 457. The disks of one of these series are shown separately in Fig. 20, it being understood that the five series have the same construction. As the segment gears 310 are moved differentially directly from one position to another under the control of the amount keys, as above described, the operating disks 457 are moved with the segment gears into position to operate the punches 440 representing the amount set up on the amount keys. The disks 457 of each series are provided with projections 458, which are so arranged that the projections on two of the disks are in operative relation with corresponding punches at each operation of the machine so that two of the punches are operated to represent one digit. After the disks 457 are positioned the levers 444 (Figs. 13, 21, 24 and 27) carrying the frames 443 and 448 are rocked clockwise (Fig. 21), as will be described later, whereupon the selected punches engage the projections 458 in coöperative relation therewith to force these punches through the record strip and into the corresponding holes 449 in the plate 450 and frame 448 while the other punches not selected for operation are moved rearwardly with the frame 443 as their rear ends move between the projections 458 on their corresponding disks.

The segment gear 340 (Fig. 11) controlled by the right hand bank of clerks' keys, meshes with a pinion 459 (Figs. 11 and 17) fast on a shaft 460 journaled at its ends to the side frames 41 of the machine. Fast on the shaft 460 are five disks 463 (Figs. 17 and 19), one for each of the clerks' keys in the bank. The disks 463 are provided with projections 466 which are spirally arranged so that only the projection on the disk appropriate to the clerk's key depressed is moved into operative relation to the corresponding punch 440.

The segment gear 340 (Fig. 2B) controlled by the left hand bank of clerks' keys meshes with a pinion 468 (Fig. 17) fast on the right hand end of a sleeve 469 loosely mounted on the shaft 460. The sleeve 469 carries nine disks 470 (Figs. 17 and 18) which are spirally arranged so that the projection 473 of the disk appropriate to the clerk's depressed key is moved into operative relation with the corresponding punch 440. When a key is depressed in the left hand bank of clerks' keys the shaft 460 controlled by the right hand bank of clerks' keys is adjusted to zero position so that none of the projections on the disks 463 carried by the shaft are in operative position with their punches. Likewise when a key in the right hand bank of clerks' key is depressed the sleeve 469 which is controlled by the left hand bank of clerks' keys is moved to zero position so that none of the projections on the disks 470 are in operative relation with their corresponding punches. There is no punch 440, or disk 463 appropriate to the special key 37 so that when this key is depressed none of the punches in the middle row are operated, all of the projections 466 and 473 on the disks 463 and 470 respectively being out of operative relation with the corresponding punches 440. When a total or sub-total is to be printed the machine is released by depression of this special key 37, as above described.

The segment gear 330 (Fig. 13), moved differentially by the cashier's lever 134, meshes with a pinion 475 (Figs. 13 and 17) fast on a shaft 476 journaled at its ends in the side frames 41 of the machine. Rigidly mounted on the shaft 476 are three disks 477 (Fig 17) having projections 478 which are selectively moved by the cashier's lever 134 into coöperative relation with the punches appropriate to the cashiers.

The segment gear 305 connected to the transaction lever 80 by the link 306 meshes with a pinion 479 (Figs. 4 and 17) fast on the left hand end of a sleeve 480 loosely mounted on the shaft 476. Near its right hand end the sleeve 480 carries three disks 483 (Figs. 17 and 19) which are appropriate to the "cash", "charge", and "C. O. D." positions (Fig. 1A) of the transaction lever. The disks 483 are provided with projections 485 which are spirally arranged so that the punch appropriate to the position of the transaction lever is operated during operation of the machine. There are no disks 483 appropriate to the total and sub-total printing positions of the transaction lever so that during total and sub-total printing operations the three punches controlled by the transaction lever are not operated. When the machine is operated for printing a total or sub-total a department key is not operated, the cashier's lever is moved to its "special" position and the machine is released by depression of the special key 37. Therefore, during total and sub-total printing operations only the amount punches 440 are operated. When the record strip is run through the auditing machine of the above mentioned co-pending application filed by the present applicant, there are no perforations representing the various totalizers in connection with the amount perforations representing the totals and sub-totals and therefore during the cycles of operation of the auditing machine in which the totals and sub-totals control the actuating mechanism the totals and sub-totals are not added on any of the totalizers.

The segment gear 355 (Fig. 2A) controlled by the bank of department keys meshes with a pinion 487 (Fig. 17) fast on the right hand end of a sleeve 488 which carries six disks 489 (Figs. 17 and 18) appropriate to the department keys and a disk 490 appropriate to the number key 36. Each of the disks 489 and 490 is provided with a projection 493 and the disks are spirally arranged on the sleeve 488 so that only the projection 493 of the disk appropriate to the depressed key in the bank of department keys is moved into coöperative relation with its corresponding punch 440.

As above stated, after the above mentioned disks have been positioned differentially the levers 444 (Figs. 7 and 21) are rocked clockwise to carry the punches 440 rearwardly. During this movement of the levers 444 the projections on the disks which have been moved into operative positions engage the corresponding punches 440, thereby arresting their movement while movement of the unselected punches and the record strip is continued. In this manner the selected punches are forced through the record strip to make perforations representing the data set up on the keyboard. When the levers 444 are rocked counter clockwise to normal position the springs 442 (Fig. 24) coiled about the punches restore the operated punches to normal position relative to the frame 443. For the purpose of rocking the lever 444, rollers 494 (Fig. 21), mounted on the rear ends of the rearwardly extending arms of the levers project into cam grooves 495 formed in corresponding disks 496 fast on the shaft 97. The cam grooves 495 are constructed to rock the levers 444 first clockwise and then counter clockwise to normal position. Frames 491 (Figs. 11 and 17) fast on the base of the machine, are provided to hold the shafts 456, 460 and 476 rigid when the punches strike the projections on the operating disks.

Record strip feeding means.

Figure 21:
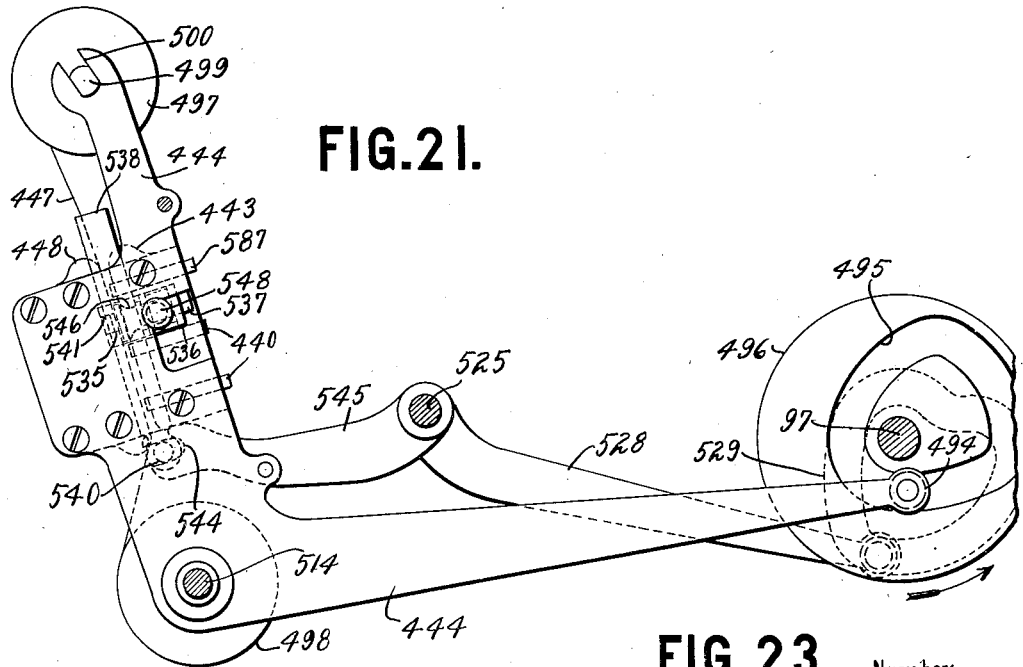
Fig. 21 is a right hand side view of the perforating mechanism for the record strip.

The record strip 447 (Figs. 7 and 27) is fed from a supply roll 497 down between the frame 443 and 448 and onto a storage roll 498. The ends of the rod 499, loosely carrying the supply roll 497, are flattened as shown in Fig. 21 and engage in recesses 500 formed in the upper ends of the upwardly extending arms of the levers 444. The storage roll 498 when attached to the machine is slid over a sleeve 504 (Fig. 28) and is splined thereon so that the roll and sleeve rotate together. The sleeve 504 is fast on cylindrical members 505 loosely mounted on a shaft 506. A circular flange 507 on the left hand end of the storage roll 498 and a correspondingly shaped disk 508 fast on the right hand member 505 serve to guide the record strip as it is fed onto the storage roll. The shaft 506 at its ends is provided with projections 510 which project into recesses 513 formed in the ends of rods 514 loosely mounted in the hubs 445 of the levers 444. The ends of the rods 514 provided with the recesses 513 project into the cylindrical members 505 and therefore support the shaft 506. The rods 514 are slid to normal position in the hubs 445 to move their recesses 513 over the projections 510 when the storage roll is inserted into the machine.

The storage roll 498 is frictionally driven by the shaft 506 so that the amount of record strip fed on the storage roll is always the same. An additional feeding means, to be described hereinafter, is provided for feeding the strip an invariable distance from the supply roll upon each operation of the machine and therefore the storage roll 498 is frictionally driven so that the amount of record strip invariably fed from the supply roll is stored on the storage roll. A spring 515 (Fig. 28) is coiled about the shaft 506 and is mounted at its left hand end in a disk 516 fast on the shaft 506 and at its right hand end in a disk 517 loose on the shaft 506. The spring 515 is compressed between the disks 516 and 517 to press the disk 517 firmly against the right hand member 505 and the left hand member 505 against the disk 516. When the shaft 506 is rotated an invariable distance during each operation of the machine, as will be described presently, it can be seen that the disks 516 and 517 frictionally connect the storage roll to the shaft 506 so that the storage roll is rotated by the shaft 506 until the amount of record strip fed from the supply roll is wound on the storage roll after which the shaft 506 rotates independently of the storage roll. It is obvious that, as the size of the roll of paper on the storage roll increases the extent of movement of the storage roll proportionally decreases.

Figure 22:
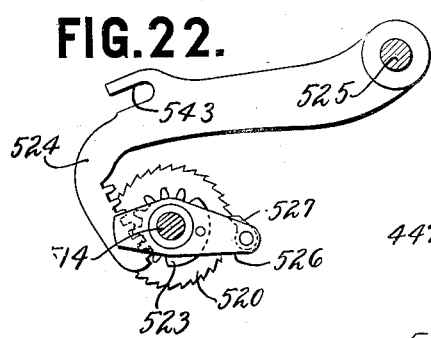
Fig. 22 is a detail side view of part of one of the feeding devices for the record strip.

The means for rotating the shaft 506 an invariable distance will now be described. A ratchet 520 (Figs. 22 and 28) is splined on the left hand rod 514 so as to rotate therewith. Loosely mounted on the hub of the ratchet 520 is a disk 523 having teeth meshing with the teeth formed on an arm 524 fast on a shaft 525 journaled at its ends in the side frames of the machine. Fast on the disk 523 is a lever 526 which at its rear end carries a pawl 527 coöperating with the ratchet 520. Rigidly mounted on the shaft 525 is a rearwardly extending arm 528 (Fig. 21) which at its rear end carries a roller projecting into a cam groove 529 formed in the face of a disk 530 (Fig. 2ᴬ) rigidly mounted on the main drive shaft 97. The cam groove 529 is so constructed that near the beginning of the operation of the machine the arm 524 is rocked counter clockwise (Fig. 22) whereupon the lever 526 is rocked in the same direction so that its pawl 527 rotates the ratchet 520, rods 514 and shaft 506 and hence the storage roll to feed the record strip.

Figure 24:
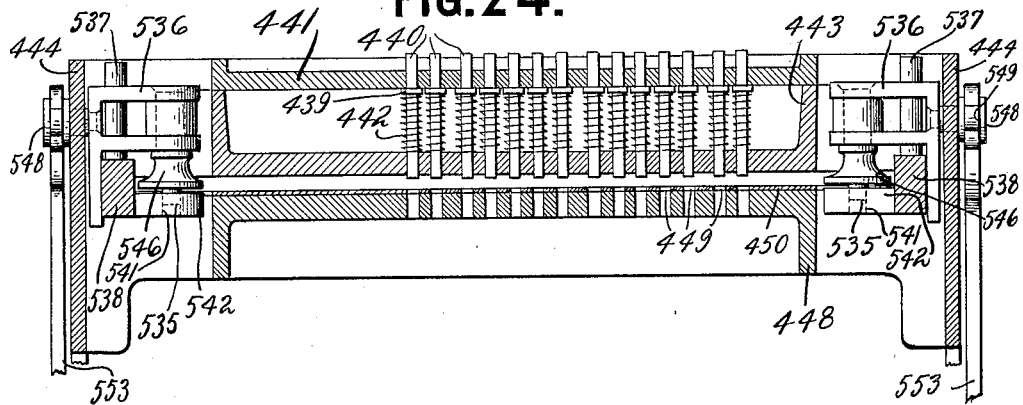
Fig. 24 is a full sized transverse vertical section through the perforating mechanism, the section being taken on the line 24—24 of Fig. 27.
Figure 25:
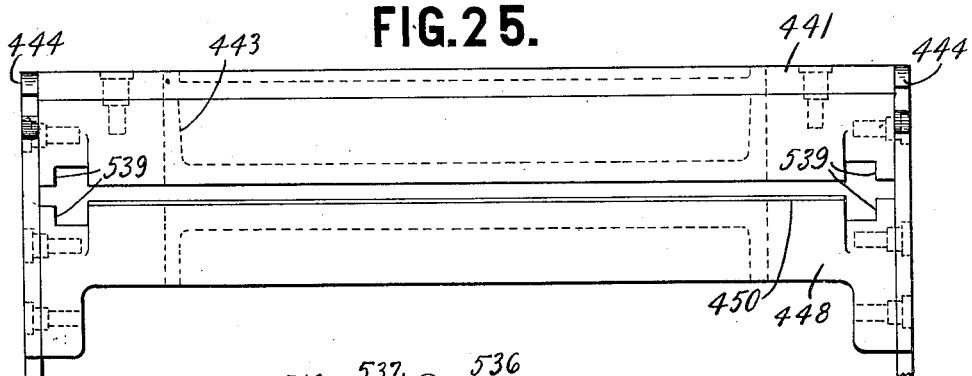
Fig. 25 is a full sized detail top plan view of the frames shown in Fig. 24.
Figure 26:
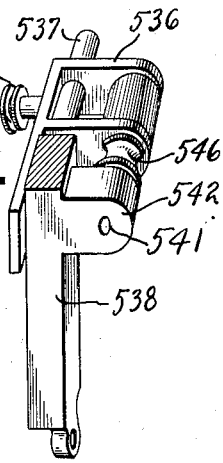
Fig. 26 is a full sized perspective view of one of the feeding devices for the record strip.

The above mentioned feeding means for feeding the record strip an invariable distance from the supply roll 447 is adapted to make perforations 534 (Fig. 23) near the edges of the record strip and the feeding means in the auditing machine of the above mentioned co-pending application of Goldberg coöperates with these perforations 534 to feed the strip. The perforations 534 are made by punches 535 (Figs. 21, 24 and 27) mounted in frames 536 which, as best shown in Figs. 24 and 26, are slidably mounted on corresponding pins 537. The pins 537 project from bars 538 sildably mounted in grooves 539 (Fig. 25) formed in the frames 443 and 448. A pin 540 on the left hand bar 538 (Fig. 7) projects into a recess 543 formed in the arm 524 and a pin 540 (Fig. 21) on the right hand bar 538 projects into a recess 544 formed in the forward end of an arm 545 also fast on the shaft 525. The punches 535 (Figs. 24, 26 and 27) normally project through the record strip and into holes 541 formed in projections 542 on the bars 538 so that when the shaft 525 and therefore the arms 524 and 545 are rocked counter clockwise (Fig. 21), as above described, the bars 538 and punches are lowered to feed the record strip from the supply roll. While the bars 538 are in their lowered positions the frames 536 are slid rearwardly on the pins 537, as will be described presently, to move the punches 535 out of engagement with the record strip. Then after the bars 538 are elevated to normal position with the arms 524 and 545 and the shaft 525, the frames 536 are moved forwardly to normal position so that the punches 535 perforate the record strip. During the feeding of the record strip by the punches 535 rollers 546 mounted on the punches firmly press the record strip against the projections 542 on the bars 538, thereby gripping the record strip between them and relieving the tension between the punches 535 and the paper to prevent the paper from being torn by the punches.

The means for sliding the frames 536 on the pins 537 will now be described. The frames 536 carry pins 548 (Figs. 11, 13, 24, 26 and 27), the heads of which are provided with grooves 549 (Fig. 26) into which project the sides of recesses 550 (Fig. 11) formed in the upwardly extending arms of corresponding levers 553. When the frames 536 are raised and lowered, as above described, the pins 548 move in the recesses 550. The rearwardly extending arms of the levers 553, which are loosely mounted on the hubs 445 of the levers 444, carry rollers 554 projecting into corresponding cam grooves 555 formed in the faces of disks 556 (Figs. 2ᴬ and 2ᴮ), fast on the main drive shaft 97. The cam grooves 555 are so constructed that the levers 553 are rocked clockwise (Fig. 11) after the punches 535 have been lowered to slide the frames 536 rearwardly on the pins 537 and thereby move the punches 535 out of engagement with the record strip. Then after the punches have been elevated to normal position the levers 553 are rocked counter clockwise to normal position to force the punches 535 through the record strip so that when these punches are lowered at the next operation the record strip is fed another step.

*Removal of record strip.*

When the record strip is removed from the machine the rods 514 (Fig. 28) are slid in the hubs 445 to move their recesses 513 out of engagement with the projections 510 on the ends of the shaft 506 so that the shaft 506 with the storage roll 498 may be taken from the machine. Before the record strip is removed from the machine perforations representing the number of the machine are made in the record strip and the number punch 440 is operated. Means are provided for compelling operation of the machine to make these perforations before the record strip can be removed from the machine. When the machine is operated to make these perforations the number is set up on the amount keys, the transaction lever 80 (Fig. 1ᴬ) is moved to its lowermost or "number" position, the cashier's lever 134 is moved to its uppermost or "special" position, the number key 36 (Fig. 1ᴬ) is operated and finally the special key 37 (Fig. 1ᴮ) is depressed to effect release of the machine.

Arms 558 (Figs. 13 and 27) are rigidly mounted on corresponding shafts 559 journaled in the frames 446 and the arms 558 normally project over the ends of the rods 514, thereby preventing the rods from being moved out of engagement with the shaft 506. The rear ends of the arms 558 carry rollers 563 which normally engage corresponding levers 564 loosely mounted on the shaft 358. Loosely mounted on the shaft 358 is a plurality of levers 565 (Figs. 4, 7 and 11), one for each of the segment gears 305 (Fig. 2ᴬ), 310, 355, 340, (Fig. 2ᴮ) and 330. The rearwardly extending arms of the levers 565 and 564 are connected by a cross rod 566. A spring 567 (Fig. 7) tends to rock the levers 564 and 565 counter clockwise, but such movement is normally prevented by the engagement of the levers 564 with the rollers 563. Fast on each of the segment gears 305, 310, 330, 340 and 355 is a plate 570 (Figs. 4, 7 and 11) provided with a single notch 573. The notches 573 are so positioned in the plates 570 that all of them are moved in cooperative relation with the noses 574 formed on the forward ends of the corresponding levers 565 only during an operation of the machine in which the keyboard has been operated properly to control the punches for punching the number of the machine. Fast on the shafts 559 (Figs. 11, 12 and 27) are arms 575 which are gripped by the operator and moved counter clockwise (Figs. 11 and 13) when the strip is to be removed from the machine.

From the above construction it can be seen that when the arms 575 and shafts 559 are rocked counter clockwise (Fig. 13) the arms 558 on the shafts 559 are moved out of the path of movement of the rods 514 to permit movement of the rods so that the record strip on the storage roll may be removed from the machine. When the arms 558 are rocked in this manner their rollers 563 rock the levers 564 and 565 clockwise (Figs. 7, 11 and 13) to move the noses 574 on the levers 565 in engagement with the recesses 573 formed in the plates 570. It is obvious that if any one of the segment gears 305, 310, 330, 340 or 355 is not in its predetermined position to permit the perforating of the number representing the number of the machine the nose 574 on the corresponding lever 565 cannot move into the recess 573, and therefore the arms 558 (Fig. 13) are locked in normal position over the ends of the rods 514. It is, therefore, necessary that the keyboard be operated properly before the record strip can be removed from the machine.

Fast on the shafts 559 are cams 580 (Fig. 11) which engage forwardly extending arms 583 of the levers 553. When the levers 575 and shafts 559 are rocked to permit removal of the record strip the cams 580 rock the levers 553 clockwise to move the punches 535 (Fig. 24) out of engagement with the record strip. The levers 553 are rocked in this manner against the action of springs 584 and when the levers are rocked their rollers 554 engage the set-offs 585 formed in their cam grooves 555 to permit operation of the levers. It can be seen that as the rollers 554 are positively retained in the setoffs 585 when the arms 558 (Fig. 13) are in position permitting removal of the record strip the operating mechanism is locked against operation as an incident to the removal of the strip from the machine.

*Insertion of record strip.*

When the storage roll 498 is inserted in the machine the rods 514 are slid to their normal position shown in Fig. 28 and then the arms 575 (Fig. 13) and shafts 559 are rocked clockwise to normal position. When the arms 575 are rocked to normal position rollers 586 on the arms 575 coöperate with the arms 583 of the levers 553 positively to move the latter to normal position.

A punch 587 (Figs. 11 and 13) positioned in the upper row of punches and adapted to coöperate with a hole 588 (Fig. 27) formed in the frame 448 is operated to make a perforation 589 (Fig. 23) in the record strip. This perforation controls the stopping of the auditing machine shown in the above mentioned copending application filed by M. M. Goldberg when the record strip is run through the same. An arm 593 (Figs. 13 and 27) fast on a shaft 594 mounted in the right hand lever 444 engages the rear end of the punch 587. Also fast on the shaft 594 is a downwardly extending arm 595 normally in engagement with the upper end of an arm 596 fast on a shaft 597. The shaft 597 is journaled in the right hand lever 444 and in an arm 598 fast on the hub 445. When the right hand arm 558 is rocked counter clockwise (Fig. 13) to permit removal of the record strip the arm engages an arm 599 fast on the shaft 597 thereby rocking the arm 599, shaft 597 and arm 596 clockwise until the roller passes out of engagement with the arm 599 when they are rocked to normal position by gravity. When the storage roll is inserted into the machine and the right hand arm 558 is moved to normal position this arm engages the upper edge of the arm 599, thereby rocking the arm 596 counter clockwise past normal position. During this movement the arm 596 engages the arm 595 and rocks the arm 595, shaft 594 and arm 593 clockwise past normal position whereupon the punch 587 is operated to make the perforation 589 in the record strip. When the roller 563 moves out of engagement with arm 599 the spring coiled about the punch 587 restores the punch and arms 596 and 599 to normal position.

*Operation.*

Having described in detail the construction and operation of the various parts of the present invention a résumé of the operation of these parts will be given.

When a cashier goes on duty the cashier's lever 134 (Fig. 1ᴮ) is adjusted to the position indicated by the number assigned to the cashier. When a transaction is to be entered in the machine the cashier inserts the sales slip through the opening 417 on to the table 419, and then adjusts the transaction lever 80 (Fig. 1ᴬ) in accordance to the class of the transaction. The amounts keys 33 and department keys 34 are then operated and finally the proper clerk's key 35 is depressed to release the operating mechanism. If the transaction lever 80 has been adjusted to its "cash" position the totalizer is moved into engagement with the actuators when adjusted and before their movement to normal position is begun and moved out of engagement therewith after the actuators have been restored to add the amount on the totalizer. If the transaction lever is in its "C. O. D." or "charge" position the totalizer is not moved into engagement with the actuators. During the operation of the machine the various type carriers (Figs. 2ᴮ and 32) controlled by the keyboard are moved differentially in accordance to the operation of the keyboard, as fully described above. After the type carriers have been differentially positioned the detail strip 299 (Fig. 29) is lowered to print from the upper printing line of the type carriers. The platen arm 420 is operated twice to print from the lower printing line of the type carriers on the original and duplicate portions of the sales slip, the sales slip being fed between impressions by the feeding rollers 427 and 428.

The operating disks, shown in Fig. 17, for operating the punches 440 are differentially positioned as above described at the same time that the type carriers are positioned. After the operating disks have been differentially positioned the levers 444 (Fig. 21) are rocked clockwise, whereupon the disks in operative positions operate the corresponding punches to perforate the record strip. Before the punches are operated the two feeding devices for the record strip fully described above, are operated to feed the strip one space.

When a total or sub-total is to be printed from the totalizer on to the detail strip the cashier's lever 134 is moved to its uppermost or "special" position so that the cashier's type carrier does not print and also so that none of the cashier's punches are operated. The transaction lever 80 is then moved to its "total" or "sub-total" position and finally the special key 37 is operated to release the machine. If the total lever is in "total" position the totalizer is reset and left in zero position, but if the total lever is in "sub-total" position the amount originally standing on the totalizer is restored thereon during return movement of the actuators to normal position. The total or sub-total is printed on the detail strip together with a character designating whether the amount is a total or sub-total. The amount punches are also operated to perforate the record strip accordingly, but as no other perforations are made the total or sub-total represented by the perforations is not added on any of the totalizers of the auditing machine of the above mentioned co-pending application when the strip is run through the same.

At the end of the day's business or any other desired time the record strip is removed from the machine and taken to the auditing department where it is run through the auditing machine. When the record strip is to be removed from the machine the transaction lever 80 is moved to its "number" position and the cashier's lever 134 is moved to its "special" position so that the corresponding type carriers do not print and punches in the corresponding series are not operated. The number of the machine is then set up on the amount keys, the number key depressed, and finally the special key is operated to effect release of the machine. During operation of the machine the punches 440 corresponding to the amount keys depressed and the number punch are operated so that when the record strip is run through the auditing machine the perforation made by the number punch selects the accounting device which prints the number set up thereon under the control of the perforations representing the number of the machine. After the machine has been operated to print the number the arms 575 are manually operated to permit removal of the record strip roll from the machine as fully described above.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow:

What is claimed is:—

1. In a machine of the class described, the combination of a frame carrying record material, means for rocking said frame, means carried by said frame for gripping said record material, means for moving said gripping means to grip said record material, and means for moving said gripping means to feed said record material.

2. In a machine of the class described, the combination of a frame carrying record material, means for rocking said frame, means carried by said frame for gripping said record material, means for positively moving said gripping means to grip said record material, and means for moving said gripping means to feed said record material.

3. In a machine of the class described, the combination of a frame carrying record material, means for rocking said frame, means carried by said frame for gripping said record material, means for positively moving said gripping means to grip said record material, and means for positively moving said gripping means to feed said record material.

4. In a machine of the class described, the combination of a frame carrying record material, means for rocking said frame, punches carried by said frame, means for moving the punches through the record material, and means for moving the punches while the latter project through the record material to feed the same.

5. In a machine of the class described, the combination of a frame carrying record material, means for rocking said frame, punches carried by said frame, means for positively moving the punches through the record material, and means for moving the punches while the latter project through the record material to feed the same.

6. In a machine of the class described, the combination of a frame carrying record material, means for rocking said frame, punches carried by said frame, means for positively moving the punches through the record material, and means for positively moving the punches while the latter project through the record material to feed the same.

7. In a machine of the class described, the combination of sliding bars, pins on said bars, frames slidably mounted on said pins and provided with means for gripping record material, means for sliding said frames on said pins, and means for sliding said bars to feed the record material.

8. In a machine of the class described, the combination of sliding bars, pins on said bars, frames slidably mounted on said pins for gripping record material and punches thereon for perforating the record material, means for positively sliding said frames on said pins thereby gripping and punching the record material, and means for positively sliding said bars to feed the record material.

9. In a machine of the class described, the combination of sliding bars, pins on said bars, frames slidably mounted on said pins, punches on said frames, means for sliding said frames to force the punches through the record material, and means for sliding said bars, while the punches project through the record material to feed the latter.

10. In a machine of the class described, the combination of recording means, a frame carrying record material, means for rocking said frame to record on said record material, bars slidably mounted in said frame, pins on said bars, devices slidably mounted on said pins for gripping the record material, levers for sliding said devices on said pins to move the devices into and out of gripping position, and means for sliding said bars on said frame while the devices are in gripping position to feed said record material.

11. In a machine of the class described, the combination of gripping means normally gripping record material, means carrying said gripping means, means for sliding said gripping means on said carrying means to move the gripping means into and out of gripping position, mechanism for moving said carrying means whereby the gripping means feeds said record material, and means for moving said gripping means out of gripping position to permit removal of the record material.

12. In a machine of the class described, the combination of gripping means normally gripping record material, means carrying said gripping means, a lever, means for operating said lever to move the gripping means into and out of gripping position, mechanism for moving said carrying means whereby said gripping means feeds said record material, and manipulative means for moving said gripping means out of gripping position to permit removal of the record material.

13. In a machine of the class described, the combination of means normally gripping record material, a main operating mechanism for moving the gripping means out of and into gripping position and for moving the gripping means to feed the record material, and manipulative means for moving said gripping means out of gripping position to permit removal of the record material.

14. In a machine of the class described, the combination of a punch normally projecting through record material, a main operating mechanism for reciprocating the punch to perforate the record material and for moving the punch to feed the record material, and manipulative means for moving the punch out of normal position to permit removal of the record material from the machine at the termination of a series of the punching operations.

15. In a machine of the class described, the combination of a punch normally projecting through record material, a main operating mechanism for positively reciprocating the punch to perforate the record material and for positively moving the punch to feed the record material, and manipulative means for moving the punch out of normal position to permit the removal of the record material from the machine and the insertion therein at the termination of a continuous punching operation of considerable extent.

16. In a machine of the class described, the combination of means normally gripping record material, means carrying said gripping means, a lever for moving said gripping means on said carrying means to move the gripping means into and out of gripping position, operating mechanism for operating said lever and moving said carrying means whereby the gripping means feeds said record material, and manipulative means for operating said lever to move said gripping means on said carrying means and thereby permit removal of the record material from the machine.

17. In a machine of the class described, the combination of a device preventing removal of a record strip from the machine, until said device is operated, and means operated by said device when the record strip is attached to the machine to record upon said strip.

18. In a machine of the class described, the combination of a device preventing removal of a record strip from the machine until said device is operated, means operated by said device when the record strip is attached to the machine to record upon said strip, and means for locking the machine against operation, when said device is operated to permit removal of the strip.

19. In a machine of the class described, the combination of a device preventing removal of a record strip from the machine until said device is operated after a series of continuous punchings, and means operated by said device when the record strip is attached to the machine to perforate said strip for the purpose described.

20. In a machine of the class described, the combination of a manually operable arm actuated at the end of a continuous punching operation normally in position to prevent the removal of a record strip from the machine, and a punch operated by said arm upon movement of the latter to normal position at the time of the insertion of the strip, to perforate the strip for the purpose described, after the record strip is inserted in the machine.

21. In a machine of the class described, the combination of a manually operable arm normally in position to prevent the removal of a record strip from the machine, a punch operated by said arm upon movement of the latter to normal position, to perforate the strip for the purpose described, after the record strip is inserted in the machine, and means for locking the machine against operation while said arm is out of normal position.

22. In a machine of the class described, the combination of a punch for perforating a record strip, control means for said punch, whereby said punch is operated upon the insertion of a record strip, and insertion is prevented unless said punch is operated.

23. In a machine of the class described, the combination of recording means, control means for said recording means whereby said recording means is operated upon the insertion of a record strip, and insertion thereof is prevented unless said recording means is operated.

24. In a machine of the class described, the combination of a main operating mechanism, a record strip therein, control means for the operating mechanism preventing the actuation thereof upon removal of the record strip, and manually operated means for positioning said control means during the removal of a record strip near the end of the use thereof in said machine.

25. In a machine of the class described, the combination of a main operating mechanism, a record strip therein, normally inoperative control means for the operating mechanism preventing the actuation thereof upon removal of the record strip, and manually operated means for positioning said control means during the removal of a record strip near the end of the use thereof in said machine.

26. In a machine of the class described, the combination of a main operating mechanism, a locking device therefor, normally out of locking position, means necessitating movement of said locking means to locking position to permit the removal of a record strip from the machine, and means operated when the locking means is moved to normal position, to record upon the record strip when the latter is inserted in the machine.

27. In a machine of the class described, the combination of recording means for a record strip removably connected in said machine, means for maintaining the connection in place, and means preventing the removal of the strip until said recording means has acted upon said record strip supplemental to the main recording operation.

28. In a machine of the class described, the combination of recording means for a record strip removably connected to said machine, means for maintaining the connection in place and means to prevent the removal of the strip prior to the recording thereon of certain data supplemental to the recording previously made thereon.

29. In a machine of the class described, the combination of recording means for indicating upon a record strip certain data, a mounting for said record strip and a mounting for said recording means, and means for actuating the mounting for the recording means supplementary to the prior recording and primarily for removal purposes prior to the removal of the record strip from its mounting.

30. In a machine of the class described, the combination of a record strip, a plurality of punches for recording in said record strip any desired data, means for retaining said record strip in said machine during the successive operation of said punches and means for releasing said record strip which is operable when certain punches have been situated and have recorded certain data.

31. In a machine of the class described, the combination means for recording on a record strip, differential mechanism for actuating said recording means, and means necessitating movement of said differential mechanism to a predetermined position before the record strip can be removed from the machine.

32. In a machine of the class described, the combination of means for recording on a record strip, a plurality of differentially movable actuators therefor, and means necessitating movement of said actuators to predetermined positions before the record strip can be removed from the machine.

33. In a machine of the class described, the combination of means normally locking a record strip in the machine, means for recording on said strip, and means necessitating a predetermined operation of said recording means to permit operation of said locking means.

34. In a machine of the class described, the combination of manually operable means normally locking a record strip in the machine, means for recording on said strip, and means necessitating a predetermined operation of said recording means before said locking means can be operated to permit removal of the record strip from the machine.

35. In a machine of the class described, the combination of a plurality of differentially movable members each provided with a recess, a plurality of arms, one for each member, and means for locking a record strip in the machine and movable to permit removal of said strip only when said members have been adjusted to bring their recesses into cooperative relation with the corresponding arms.

36. In a machine of the class described, the combination of a plurality of differentially movable members, each provided with a recess, a plurality of arms one for each member, and manually operable means for locking a record strip in the machine and movable to permit removal of said strip only when said members have been adjusted to bring their recesses into coöperative relation with the corresponding arms.

37. In a machine of the class described, the combination of means for recording upon a record strip, control means for said recording means preventing the removal of said record strip prior to the actuation of said recording means, said control means locking the machine against operation when said record strip has been removed.

38. In a machine of the class described, the combination of a punch for perforating the record strip, control means therefor preventing the removal of the record strip from the machine, said control means locking the machine against operation when the record strip has been removed.

39. In a machine of the class described, the combination of means for recording data upon a record strip, control means for said recording means, by the actuation of which the recording means shall be actuated prior to the removal of the record strip from the machine after which and in the absence of the strip the control means shall lock the machine against operation.

40. In a machine of the class described, the combination of a plurality of punches for perforating the record strip, and representing thereon certain data, control means limited by the operation of said punches to permit the removal of the record strip only after certain data has been punched thereon, said control means locking the machine against operation in the absence of the record strip.

41. In a machine of the class described, the combination of means for recording on a record strip, differential mechanism for said means, and a device necessitating movement of said differential mechanism to a predetermined position before the record strip can be removed from the machine and constructed to lock the machine against operation when the record strip is removed.

42. In a machine of the class described, the combination of manually operable means normally locking a record strip in the machine, means for recording on said strip, and means necessitating a predetermined operation of said recording means before said locking means can be operated to permit removal of the record strip from the machine, said necessitating means being constructed also to lock the machine against operation when the record strip is removed.

43. In a machine of the class described, the combination of a plurality of differentially movable members, each provided with a recess, a plurality of arms, one for each member, and means for locking a record strip in the machine and movable to lock the machine against operation and permit removal of said strip only when said members have been adjusted to bring their recesses into coöperative relation with the corresponding arms.

44. In a machine of the class described, the combination of a plurality of differentially movable members, each provided with a recess, a plurality of arms one for each member, and manually operable means for locking a record strip in the machine and movable to lock the machine against operation and permit removal of said strip only when said members have been adjusted to bring their recesses into coöperative relation with the corresponding arms.

45. In a machine of the class described, the combination of two recording means for recording on a record strip, means necessitating operation of one of said recording means to permit the removal of the record strip from the machine and for operating the other recording means to permit the insertion of the record strip in the machine.

46. In a machine of the class described, the combination of two punches for perforating a record strip, means necessitating operation of one of said punches to permit the removal of the record strip from the machine, and for operating the other punch to permit the insertion of the record strip in the machine.

47. In a machine of the class described, the combination of mechanism for recording any desired data on a record strip, means necessitating operation of said recording mechanism to record certain data to permit the removal of the record strip from the machine, and recording means operated by said first mentioned means to record on said record strip to permit the insertion of the latter in the machine.

48. In a machine of the class described, the combination of recording means, a record strip receiving the information recordable thereon, control means for said recording means whereby the operation of the recording means in a supplementary manner is necessary in connection with the insertion in and the removal from the machine of the record strip.

49. In a machine of the class described, the combination of a plurality of punches for perforating a record strip to represent any desired data, means necessitating operation of said punches to represent certain data before the record strip can be removed from the machine, and a punch operated by said means to perforate said record strip to permit the insertion of the latter in the machine.

50. In a machine of the class described, the combination of means normally locking a record strip in the machine, means for recording on said strip, means necessitating a predetermined operation of said recording means to permit operation of said locking means, and means operated by said locking means for marking on the record strip when the latter is inserted in the machine.

51. In a machine of the class described, the combination of manually operable means normally locking a record strip in the machine, means for recording on said strip, means necessitating a predetermined operation of said recording means before said locking means can be operated to permit removal of the record strip from the machine, and means operated by said locking means for recording on the record strip when the latter is inserted in the machine.

52. In a machine of the class described, the combination of two recording means for recording on a record strip, means necessitating operation of one of said recording means to permit the removal of the record strip from the machine and for operating the other recording means to permit the insertion of the record strip in the machine, said necessitating means being constructed also to lock the machine against operation when the strip is removed.

53. In a machine of the class described, the combination of two punches for perforating a record strip, means necessitating operation of one of said punches to permit the removal of the record strip from the machine, and for operating the other punch to permit the insertion of the record strip in the machine, said necessitating means being constructed also to lock the machine against operation when the strip is removed.

54. In a machine of the class described, the combination of means for recording any desired data on a record strip, means necessitating operation of said recording means to mark certain data to permit the removal of the record strip from the machine, and constructed to lock the machine against operation when the record strip is removed, and recording means operated by said necessitating means to record upon said record strip to permit the insertion of the latter in the machine.

55. In a machine of the class described, the combination of recording means for a record strip, and means for necessitating operation of the recording means to permit the insertion in and removal of the record strip from the machine, and for locking the machine against operation when the record strip is removed from the machine.

56. In a machine of the class described, the combination of manually operable means normally locking a record strip in the machine, means for recording on said strip, and means necessitating a predetermined operation of said recording means before said locking means can be operated to permit removal of the record strip from the machine, and for locking the machine against operation when the record strip is removed, and recording means operated by said locking means to record on said record strip to permit the insertion of the latter.

57. In a machine of the class described, the combination of a series of punches representing one denomination, differential means for operating a plurality of said punches to represent one digit, a main operating mechanism, and means operated by said operating mechanism for moving said differential means forwardly or backwardly directly from one position to another.

58. In a machine of the class described, the combination of a series of punches representing one denomination, a plurality of disks, one for each punch, and provided with projections for operating a plurality of said punches to represent one digit, a main operating mechanism, and differential means operated by said operating mechanism for rotating said disks forwardly or backwardly directly from one position to another.

59. In a machine of the class described, the combination of a series of punches representing one denomination, differential means for operating a plurality of said punches to represent one digit, a main operating mechanism, means operated by said operating mechanism for moving said differential means forwardly or backwardly directly from one position to another, and manipulative means for controlling the differential means.

60. In a machine of the class described, the combination of a series of punches representing one denomination, a plurality of disks, for each punch, and provided with projections for operating a plurality of said punches to represent one digit, a main operating mechanism, differential means operated by said operating mechanism for rotating said disks forwardly or backwardly directly from one position to another, and manipulative means for controlling the differential means.

61. In a machine of the class described, the combination of a series of punches representing one denomination, differential means for operating a plurality of said punches to represent one digit, manipulative means, and a main operating mechanism for moving said differential means under the control of said manipulative means.

62. In a machine of the class described, the combination of a series of punches representing one denomination, a device provided with a plurality of projections for operating a plurality of said punches to represent one digit, manipulative means, and a main operating mechanism for moving said device differentially under the control of said manipulative means.

63. In a machine of the class described, the combination of a main operating mechanism, locking means therefor, and means necessitating operation of said locking means to permit the removal of a record strip from the machine.

64. In a machine of the class described, the combination of a main operating mechanism, locking means therefor, normally out of locking position, and means necessitating movement of said locking means to locking position to permit the removal of a record strip from the machine.

65. In a machine of the class described, the combination of a plurality of differentially movable members, locking means cooperating therewith for locking a record strip in the machine and movable to permit removal of the said strip only when said members have been adjusted into predetermined positions.

66. In a machine of the class described, the combination of a plurality of differentially movable members, manually operable means cooperating therewith for locking a record strip in the machine and movable to permit removal of said strip only when said members have been adjusted to predetermined positions.

67. In a machine of the class described, the combination of means to enter therein certain items and to make a multiplicity of permanent records thereof, one of which records being made upon perforatable record material, means for carrying a supply therefor, storage means therefor, means for feeding from the supply to the storage means, means to perforate the record material in a plurality of positions and in a plurality of ways, one of which is to represent a single digit by a plurality of perforations, terminal perforations at the ends of the record and means positively actuated by the entry in and withdrawal from the machine of the record whereby said perforations are made.

68. In a machine of the class described, the combination of means to enter therein certain items and to make a multiplicity of permanent records thereof, one of which records being made upon perforatable record material, means for carrying a supply therefor, storage means therefor, means for feeding from the supply to the storage means, means to perforate the record material in a plurality of positions and in a plurality of ways, one of which is to represent a single digit by a plurality of perforations, terminal perforations at the ends of the record, means positively actuated by the entry in and withdrawal from the machine of the record whereby said perforations are made, and means to permit the entry in and withdrawal from the machine without the making of the terminal perforations.

In testimony whereof I affix my signature.

MAXIMILIAN M. GOLDBERG.